(12) United States Patent
Sakamoto et al.

(10) Patent No.: US 6,970,066 B2
(45) Date of Patent: Nov. 29, 2005

(54) MEMORY CARD READING/WRITING APPARATUS, ACCESS METHOD, PROGRAM AND STORAGE MEDIUM THEREOF

(75) Inventors: Shizuka Sakamoto, Hiroshima (JP); Masahiro Kawasaki, Hiroshima (JP); Tohru Suetomo, Hiroshima (JP); Yasuhiro Shibata, Hiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 288 days.

(21) Appl. No.: 10/617,686

(22) Filed: Jul. 14, 2003

(65) Prior Publication Data

US 2004/0104805 A1      Jun. 3, 2004

(30) Foreign Application Priority Data

Jul. 15, 2002     (JP)      ............................... 2002-205094

(51) Int. Cl.$^7$ ............................................ G05B 19/00
(52) U.S. Cl. .................... 340/5.64; 340/5.74; 235/382; 711/101
(58) Field of Search .............................. 340/5.74, 5.65; 235/375, 38, 382, 382.4, 492; 711/101, 102, 711/103; 713/200

(56) References Cited

U.S. PATENT DOCUMENTS

| | | | |
|---|---|---|---|
| 4,250,533 A | * | 2/1981 | Nelson ...................... 340/5.25 |
| 6,650,430 B2 | * | 11/2003 | Francis et al. ............. 358/1.14 |

FOREIGN PATENT DOCUMENTS

| | | | | |
|---|---|---|---|---|
| JP | 2001-211170 | | 8/2001 | |
| JP | 2001211170 | * | 8/2001 | ............. H04L 9/32 |

* cited by examiner

Primary Examiner—Michael Horabik
Assistant Examiner—M Shimizu
(74) Attorney, Agent, or Firm—McDermott Will & Emery LLP

(57) ABSTRACT

A memory card reading/writing apparatus, access method, program and storage medium thereof, that have a psychological security function, or in other words a mild security function and that make it possible to perform various kinds of management of the memory card even when the memory card is lost. In the memory card reading/writing apparatus of this invention, an apparatus-user-information-acquisition unit acquires apparatus-user information from a memory unit that stores apparatus-user information that identifies the user of the memory card reading/writing apparatus. Also, a memory-card-user-information-acquisition unit acquires the main-memory-card-user information from the memory card that identifies the main user of the memory card. A user-information-comparison unit compares the two kinds of information, and outputs a comparison result. An output unit outputs specific output based on the comparison result.

18 Claims, 33 Drawing Sheets

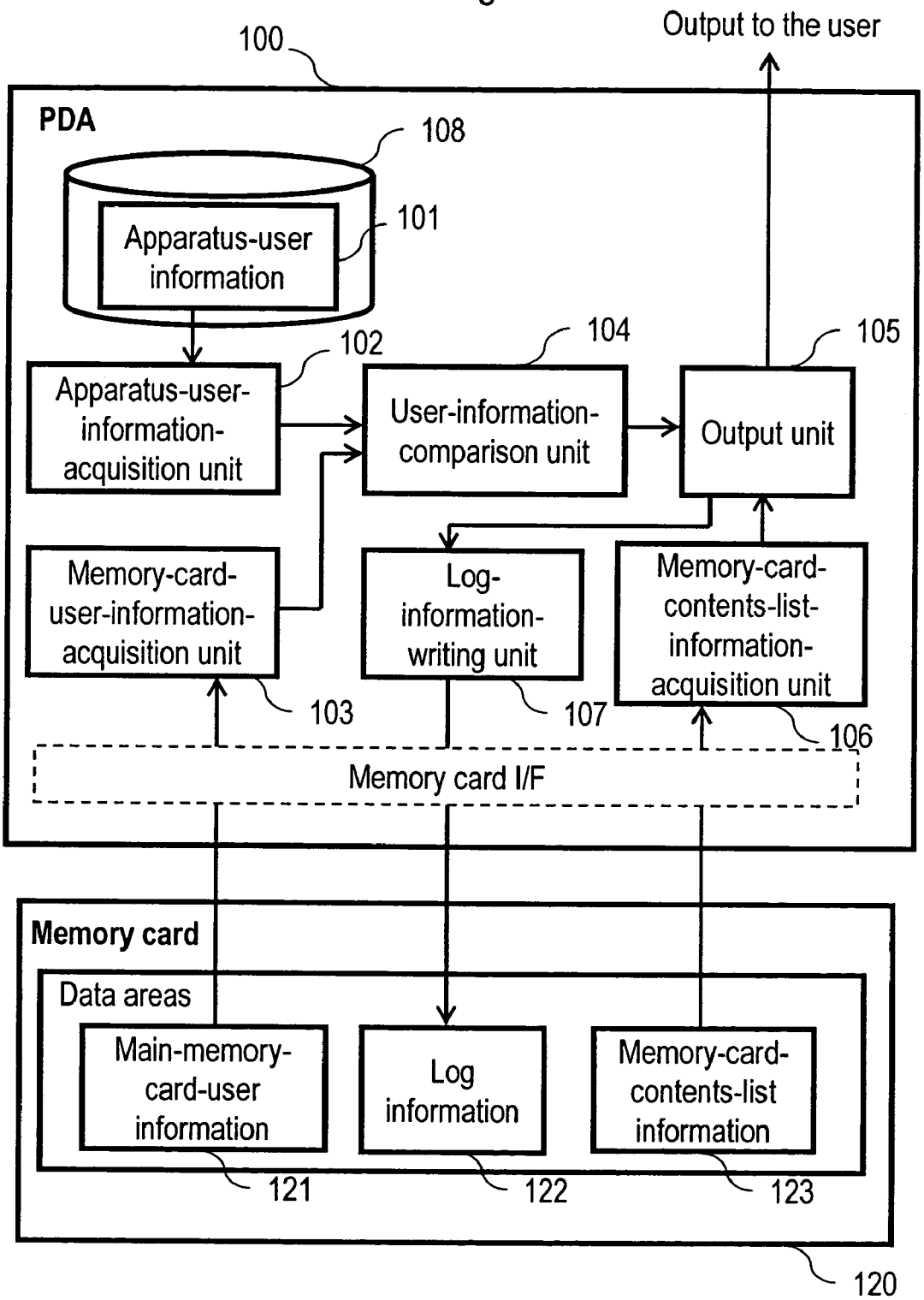

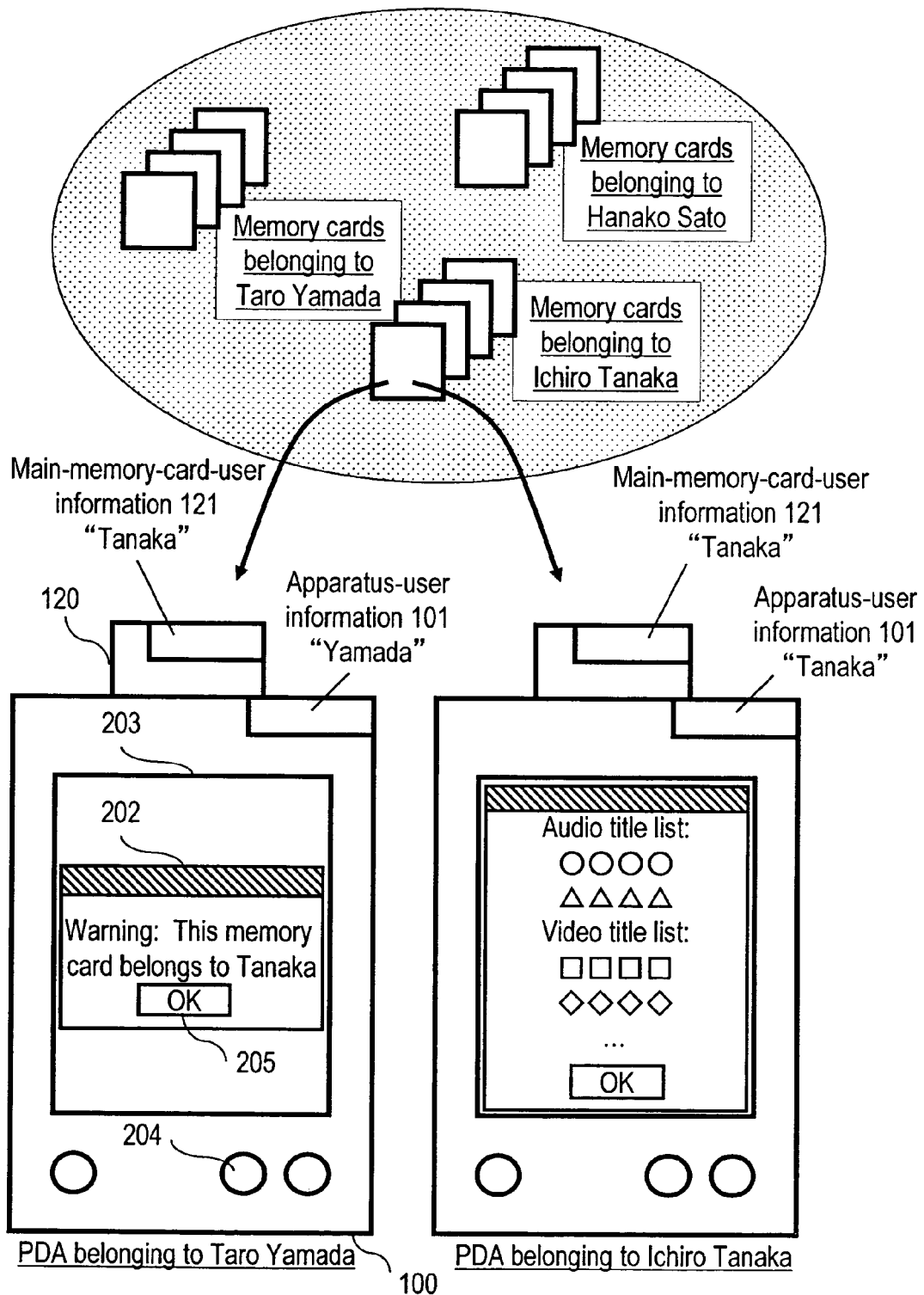

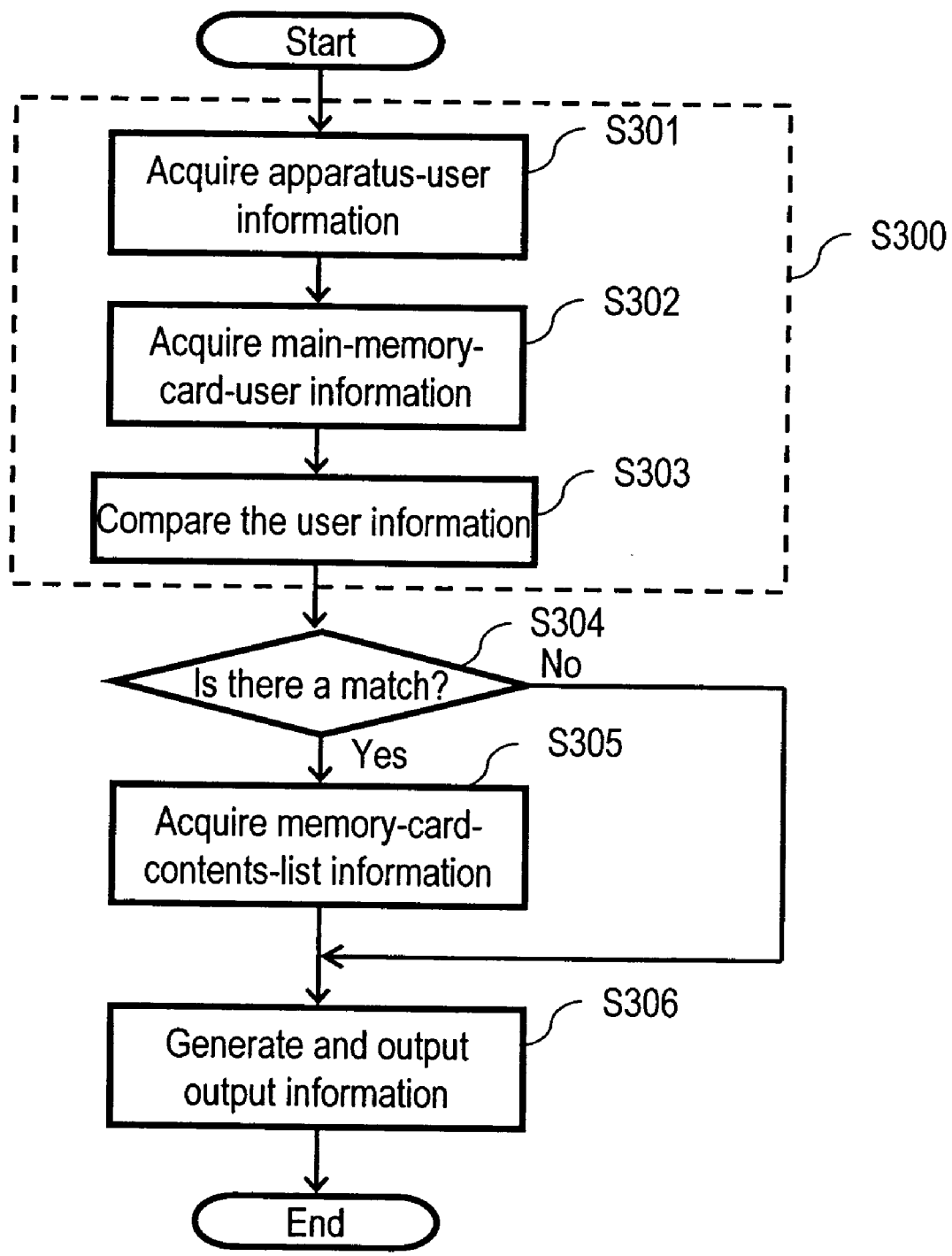

Fig. 4A

Apparatus-user information, main-memory-card-user information

| Data type | Byte(s) |
|---|---|
| User ID | 4 |
| User name | 64 |

401 — Data type row / User ID
402 — User name

Fig. 4B

Sub-memory-card-user information

| Data type | Byte(s) |
|---|---|
| Number of usable user IDs | 4 |
| User ID | 4 |
| User ID | 4 |
| .... | .... |
| User ID | 4 |

405 — Number of usable user IDs
406 — User ID (Amount of usable user IDs)

Fig. 5

| Data type | Byte(s) | Value | Explanation |
|---|---|---|---|
| Comparison result | 4 | 0 = MATCH<br>1 = UNMATCH<br>2 = NOTHING | Match<br>No match<br>No user information |

Fig. 6A

Data Structure (List Information)

Memory-card-contents-list information

| Data type | Byte(s) |
|---|---|
| Number of file types | 4 |
| File-list information | 68~ |
| File-list information | 68~ |
| .... | .... |
| File-list information | 68~ |

- 601 (Number of file types)
- 602 (File-list information)
- Lists for all file types

Fig. 6B

Data Structure (List Information)

File-list information — 602

| Data type | Byte(s) |
|---|---|
| File-type name | 64 |
| Number of files | 4 |
| File name | 128 |
| File name | 128 |
| .... | .... |
| File name | 128 |

- 603 (File-type name)
- 604 (Number of files)
- 605 (File name)
- Amount of files

Fig. 7A

Apparatus-user information

| Data type | Value |
|---|---|
| User ID | 0120 |
| User name | "Yamada" |

Fig. 7B

Apparatus-user information

| Data type | Value |
|---|---|
| User ID | 0120 |
| User name | |
| E-mail address | "yamada@saijo.xx.jp" |
| Address information | "1-1-1 Saijo, Hiroshima City" |

Fig. 8A

Main-memory-card-user information

| Data type | Value |
|---|---|
| User ID | 0124 |
| User name | "Tanaka" |

Fig. 8B

Main-memory-card-user information

| Data type | Value |
|---|---|
| User ID | 0120 |
| User name | "Yamada" |

Fig. 8C

Main-memory-card-user information

| Data type | Value |
|---|---|
| User ID | 0124 |
| User name | "Tanaka" |
| E-mail address | "tanaka@saijo.xx.jp" |

| Data type | Value |
|---|---|
| Number of file types | 2 |
| File-type name | "SD-Audio" |
| Number of files | 2 |
| File name 1 | "Black cat tango" |
| File name 2 | "White cat waltz" |
| File-type name | "SD-Video" |
| Number of files | 3 |
| File name 1 | "Graduation ceremony" |
| File name 2 | "School entrance ceremony" |
| File name 3 | "Spring trip" |

Fig. 14A

Memory-card-user information: 1401

| Data type | Byte(s) |
|---|---|
| User ID | 4 |
| User name | 64 |
| Date/time of use | 128 |

Log information: 122

| Data type | Byte(s) |
|---|---|
| Number of memory card users | 4 |
| Memory-card-user information | 196 |
| .... | .... |
| Memory-card-user information | 196 |

- 1405
- 1401
- Amount of memory card user

Memory-card-user information

| Data type | Value |
|---|---|
| User ID | 0120 |
| User name | "Yamada" |
| Date/time of use | "2002 / 3 / 8 14:00" |

Log information

| Data type | Value | |
|---|---|---|
| Number of memory card users | 2 | ⎫ 1503 |
| User ID | 0122 | ⎫ 1501 |
| User name | "Sato" | |
| Date/time of use | "2002 / 3 / 1 10:30" | |
| User ID | 0120 | ⎫ 1502 |
| User name | "Yamada" | |
| Date/time of use | "2002 / 3 / 8 14:00" | |

Fig. 16A

Memory-card-user information: 1601

| Data type | Byte(s) |
|---|---|
| User ID | 4 |
| User name | 64 |
| Date/time of use | 128 |
| Start address of referenced-contents information | 4 |

Referenced-contents information: 1603

| Data type | Byte(s) |
|---|---|
| File name | 128 |
| File type name | 64 |
| Date/time of last use | 128 |
| Number of time referenced | 4 |
| Start address of next referenced-contents information | 4 |

Log information

| Data type | Value |
|---|---|
| Number of memory-card users | 2 |
| User ID | 0122 |
| User name | "Sato" |
| Date/time of use | "2002 / 3 / 1 10:30" |
| Start address of referenced-contents information | 1010 |
| User ID | 0120 |
| User name | "Yamada" |
| Date/time of use | "2002 / 3 / 8 14:00" |
| Start address of referenced-contents information | 1001 |

Fig. 17B

Referenced-contents information

Start address 1001

| Data type | Value |
|---|---|
| File name | "White Cat Waltz" |
| File type name | "SD-Audio" |
| Date/time of last use | "2002/3/1 09:15" |
| Number of times referenced | 2 |
| Start address of next referenced-contents information | 1002 |

Start address 1002

| Data type | Value |
|---|---|
| File name | "Spring Trip" |
| File type name | "SD-Video" |
| Date/time of last use | "2002/3/1 10:00" |
| Number of times referenced | 100 |
| Start address of next referenced-contents information | NULL |

Display example

Fig. 25A

Mail-transmission information 2501

| Data type | Byte(s) |
|---|---|
| Mail address of source | 64 |
| Mail address of destination | 64 |
| Subject | 64 |
| Date/time of use | 128 |
| Apparatus-user name | 64 |
| Address information | 128 |

Mail-transmission information 2511

| Data type | Value |
|---|---|
| Mail address of source | "yamada@ saijo.xx.jp" |
| Mail address of destination | "tanaka@saijo.xx.jp" |
| Subject | "Memory-card-use information" |
| Date/time of use | "Mon 7 May 2002 15:06:44 +0900" |
| Apparatus-user name | "Yamada" |
| Address information | "1-1-1 Saijo, Hiroshima City" |

Display example

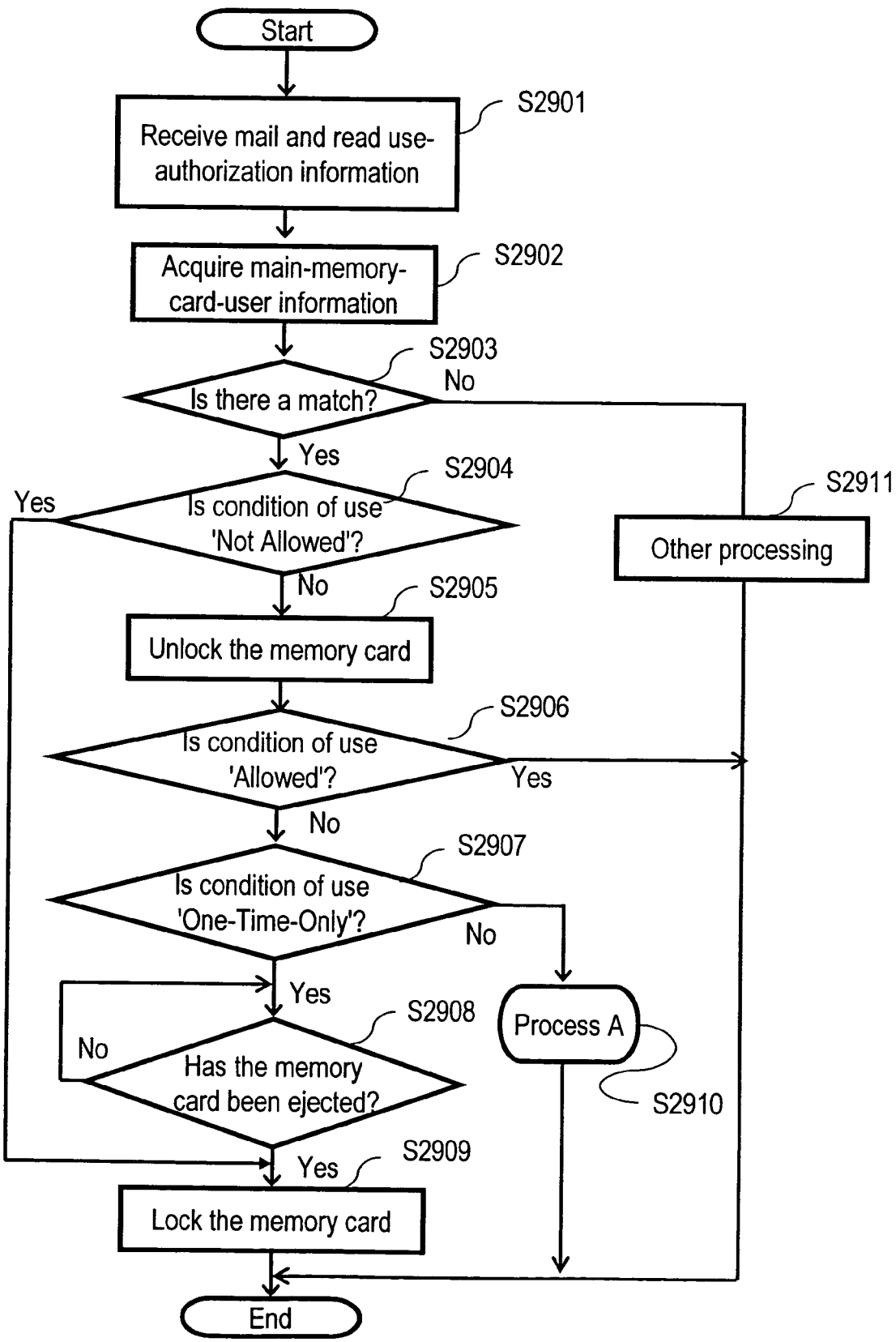

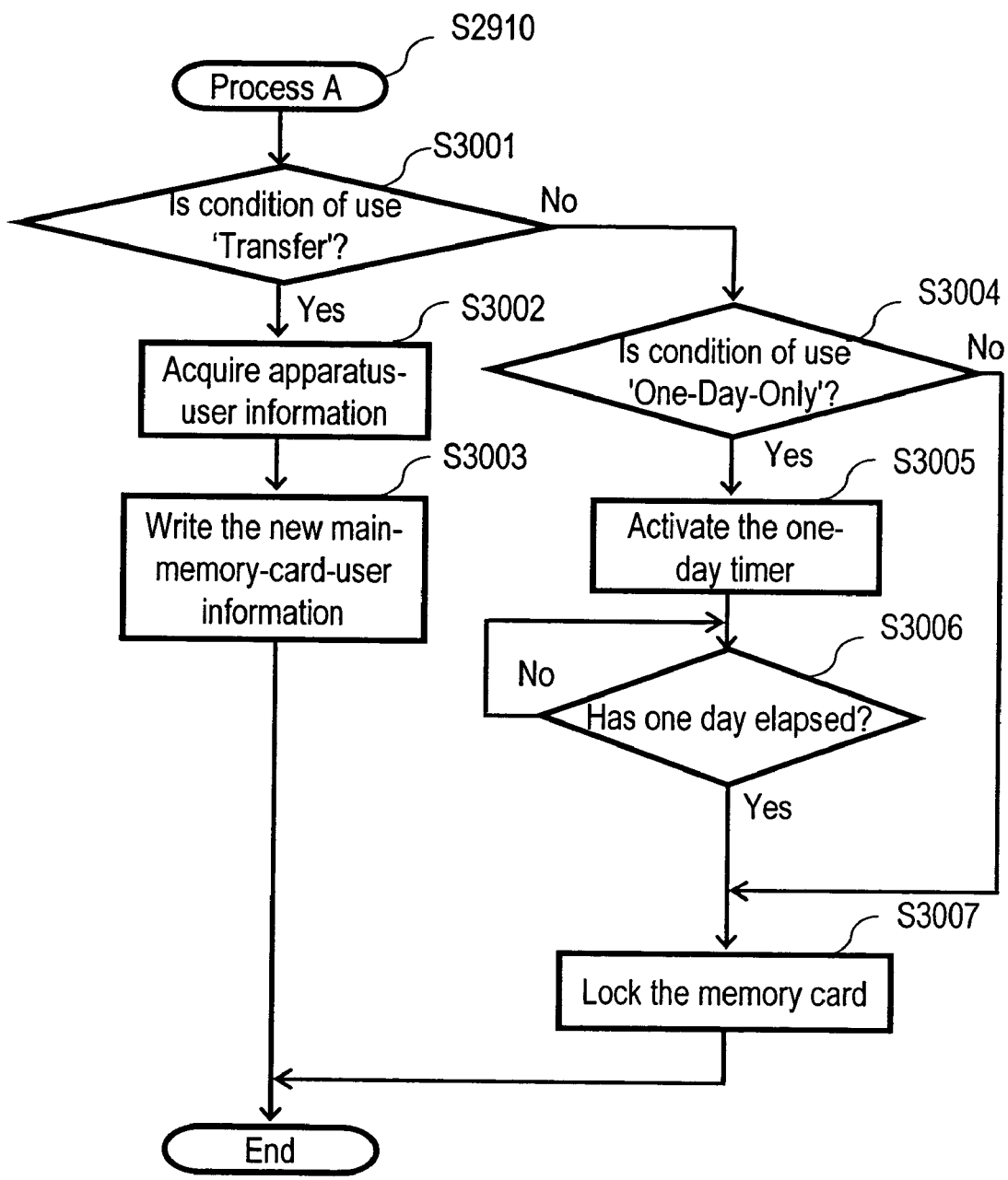

Fig. 31A

Use-authorization information — 3100

| Data type | Byte(s) |
|---|---|
| User ID | 4 |
| User name | 64 |
| Condition of use | 4 |

Use-authorization information — 3110

| Data type | Value |
|---|---|
| User ID | 0124 |
| User name | "Tanaka" |
| Condition of use | 3 |

Fig. 31C

Conditions of use

| Data type | Byte(s) | Value | Explanation |
|---|---|---|---|
| Condition of use | 1 | 0<br>1<br>2<br>3<br>4 | Transfer<br>One-day-only use allowed<br>One-time-only use allowed<br>Use not allowed<br>Use allowed |

Fig. 32A

Mail-transmission information  — 3201

| Data type | Byte(s) |
|---|---|
| Mail address of source | 64 |
| Mail address of destination | 64 |
| Subject | 64 |
| Date/time | 128 |
| Use-authorization information | 72 |

Mail-transmission information

| Data type | Value |
|---|---|
| Mail address of source | "tanaka@saijo.xx.jp" |
| Mail address of destination | "yamada@saijo.xx.jp" |
| Subject | "Memory card use authorization verification" |
| Date/time | "Mon 7 May 2002 15:06:44 +0900" |
| User ID | 0124 |
| Apparatus-user name | "Tanaka" |
| Condition of use | 3 |

} Use-authorization information

Display example

Display example

MEMORY CARD READING/WRITING APPARATUS, ACCESS METHOD, PROGRAM AND STORAGE MEDIUM THEREOF

BACKGROUND OF THE INVENTION

1. Field of the Invention

This invention relates to a memory card reading/writing apparatus that access information stored on a removable memory card, and more particularly to a memory card reading/writing apparatus that has a function for determining the owner of the memory card.

2. Description of the Related Art

In recent years, as semiconductor memories have been made more compact and mobile, and their capacity increased, memory cards have become known as a compact memory medium that can be conveniently carried and can store all kinds of data such as text files, audio contents, video contents and the like. Moreover, by taking advantage of their feature of being small in size, the memory cards can be installed in portable devices such as audio players, digital still cameras, PDAs (Personal Digital Assistants), etc. For example, an SD (Secure Digital) memory card is well known as this type of memory card.

Currently, this kind of memory card is relatively expensive, so the owner (user) does not normally transfer or distribute their memory cards to others.

It can be expected that memory cards will become less expensive in the future. That is apparent when looking at other widely used media such as FDs (Floppy Disks (R)) or CD-R.

In that kind of situation, memory cards could easily transferred to others, or it is feasible that they could be shared among a specific group. For example, memory cards could be used for neighborhood bulletins that are circulated among members of the neighborhood, or in an 'exchange-diary' that is kept among friends.

Also, depending on the type of recorded data, for example audio data, video data, text files or the like, it is also conceivable that one person may have a plurality of memory cards.

However, in the case of use where the memory card is transferred to other people or shard among a specific group, with the security technology that is used for current memory cards or other recording media, there is a possibility of obstacles to the type of use mentioned above.

In other words, the following problems would occur when absolutely no security was performed when using the memory card. For example, in the case when there are data stored in an exchange-diary or the like that are not to be seen by others, the user or group do not think favorably about others being able to see that data. That is, in the case that a memory card on which this kind of data are stored is lost, when there is no security performed, the uneasiness felt by the user is greater than in the case when security is performed.

On the other hand, in the case when stringent security is performed when using the memory card, a method for clearing the security performance, such as a password, must be given to all users. In other words, in the case of many users sharing a memory card, with the aforementioned stringent security, complicated operations are needed in order to reference the data.

An example of this stringent security is disclosed in Japanese laid-open publication No. 2001-211170. In this art, by performing an identification process that uses ID data for the memory card and ID data for the device, it is possible to prevent the memory card from being used by a device other than a specified device.

However, in this prior art, it is necessary to equip the memory card with a specific security function, and this is not possible for memory cards that are not equipped with the security function that is available in the current market. Also, as described above, the memory card can only be used on a specified device that is equipped with this kind of stringent security function, so this art cannot be used in the case when the memory card is shared by a plurality of uses.

In other words, this does not mean that security is not necessary for data that are stored on the memory card shared by a plurality of users, however, in the case of setting stringent security, there is the tendency for use to be hindered.

Moreover, in the case of a plurality of owned memory cards, a problem of managing the memory cards also occurs in addition to the problem of security described above. In other words one problem is related to managing the memory cards themselves.

As a method for managing the memory cards themselves, it is possible to attach a label to the memory card on which the contents of the various kinds of stored data are described, similar to the case of a conventional FD (R). However, since memory card continue to be made more and more compact, it is difficult to attach a label to a memory card giving the owner's name and description of the contents. Also, in the case of a person having a plurality of memory cards, attaching a label to each memory card is not only troublesome, but there is also a possibility that the label could be pared off when inserting or removing the memory card from the memory card reading/writing apparatus.

Moreover, a problem of managing the data stored on the memory card also occurs. In other words, when various kinds of data are stored on a memory card, it is necessary to execute a special application or use a special device for each kind of data in order to identify the contents of the memory card. Here, it is possible to use file-management software on a personal computer to identify the file names, however, identifying the titles of songs in the case of audio contents, for example, is not easy with a special kind of contents-management method of the memory card. In other words, a problem exists in that it is not easy to identify the contents of the data stored on the memory card.

Furthermore, a problem related to management of the users of the memory card occurs. That is, in a situation where a plurality of memory cards is shared by a plurality of users, there is a problem in that it is difficult to know who the main owner of the memory card is.

SUMMARY OF THE INVENTION

Being proposed based on the problems in the prior art, the object of this invention is to provide a memory card reading/writing apparatus, access method, program and storage medium thereof, that are capable of security that serves as a psychological protection function, or in other words, are capable of performing a mild security function that can be used even when a memory card is lost, and are capable of performing various kinds of management for the memory card.

This invention employs the following for accomplishing aforementioned objectives. In other words, it is presumed that this invention is a memory card reading/writing apparatus in which a memory card can be inserted or removed. Here, an apparatus-user-information-acquisition unit acquires apparatus-user information from a memory unit that stores apparatus-user information that identifies the users of the memory card reading/writing apparatus. Also, a memory-card-user-information-acquisition unit acquires main-memory-card-user-information from the memory card that identifies the main user of the memory card. Moreover, a user-information-comparison unit compares these two types of information, and outputs the comparison result. An output unit performs specified output base on this comparison result.

When the comparison result indicates that the apparatus-user information does not match the main-memory-card-user information, the main-memory-card-user information itself and information related to the main user of the memory card, or information indicating that there was no match is output as the output contents.

In this way, specified information (warning, main-memory-card-user information, etc.) is output, so in comparison with the case when no security is performed at all, it is possible to prevent careless reading of information recorded on the memory card, or it is possible to identify the main owner of the memory card without having to check the contents of the memory card in detail.

Even in the case when the apparatus-user information does not match the main-memory-card-user information, it is possible to read, see and reproduce information recorded on the memory card, so in comparison with the case of performing stringent security, smooth operation is possible even when the memory card is shared by more than one person.

Also, the output contents when the comparison result indicates a match is information showing a list of the data contents stored on the memory card acquired by the memory-card-contents-list-information-acquisition unit, so the user is able to easily check the contents of the memory card, or in other words, it becomes easy to manage the data stored on the memory card. Even in the case of there being a plurality of areas in the memory card, by determining each respective memory-card-user information that identifies the main user of each area, the invention can be used even when more than one user uses the memory card, and thus it is possible to improve convenience when a plurality of users use the memory card.

Furthermore, when the comparison result indicates that there is not match, a log-information-writing unit writes log information, which includes the apparatus-user information, to the memory card.

This makes it possible for the owner of the memory card to know when the memory card was used by another person. Moreover, when using a memory card for an operation, such a circulating bulletin, in which information related to the circulation status is necessary, it is possible to automatically know the circulation status. It is also possible to include information related to the contents read (accessed) from the memory card in the log information. In this case, it is possible for the owner of the memory card to know which contents have been seen.

Furthermore, the output unit outputs information indicating that an access log of the memory card has been created, and the log-information-writing unit writes the log information after the memory-card-contents-list-information-acquisition unit acquires information showing a list of the data contents stored on the memory card.

This makes it possible to include the information, "A log will be created when the information on this memory card is read", or in other words, information indicating that an access log of the memory card is created, in the information output by the output unit to a display or the like. By including this kind of information, it is possible to strengthen security from a psychological aspect when another user reads information from the memory card. Of course, for a user that has permission to use the memory card, this does become psychological security, so it does not hinder smooth operation.

Also, in the case when the apparatus-user information does not match the memory-card-user information, a function-restriction unit performs a process of decreasing the functions of the memory card reading/writing apparatus. Examples of decreasing the functions could include turning OFF the display backlight, decreasing the brightness of the display, lowering the processing speed of the CPU (Central Processing Unit), overlaying specified display data, outputting a specified sound, etc.

This makes it possible to lower the convenience of the memory card reading/writing apparatus, and as a result, increase the mild security function.

Furthermore, the memory-card-user-information-acquisition unit acquires sub-memory-card-user information from the memory card that indicates users of the memory card that are different from the main-memory-card-user information, and the user-information-comparison unit compares the apparatus-user-information with the sub-memory-card-user information, and output the comparison result.

By registering the members of a group that are allowed to use the memory card in the sub-memory-card-user information, this makes it possible for users that registered in the sub-memory-card-user information to use the memory card without a warning. That is, by using the sub-memory-card-user information that is registered on the memory card, it becomes possible for a group of users to use the memory card, so it is possible to allow free access to members within a users group and to easily set moderate restrictions for others.

Also, when the comparison result indicates a match, a user-information-generation unit receives input of the new main-memory-card-user information, and a memory-card-user-information-writing unit writes the new main-memory-card-user information that was input on the memory card.

Since it is only possible for a user to rewrite the main-memory-card-user information for the user's own memory card, this makes it possible to easily transfer the memory card to another person while maintaining mild security. As a result, it is possible to promote distribution of the contents of the memory card.

The user-information-generation unit can also be such that the new main-memory-card-user information is selectively input from the sub-memory-card-user information.

This not only simplifies input, but since main-memory-card-user information of the user's own memory card can be rewritten only to other user information of a trusted user that is registered in advance, for example a specified group member, it is possible to easily transfer the memory card to another person, while at the same time avoiding accidental distribution of personal information.

Moreover, the user-information-generation unit can also input information for the new main-memory-card-user information indicating that the user is not limited.

By writing the main-memory-card-user information without entering a new user ID or new user name, this makes it possible to distribute information to an unlimited number of users with no mild security, similar to that of a newly purchased memory card.

Moreover, when the comparison result indicates no match and the main-memory-card-user information cannot be specified, it is possible to easily transfer the memory card by making the apparatus-user information the main-memory-card-user information.

Furthermore, when registering new-apparatus-user information, it is possible to store in memory the already existing apparatus-user-information as old-apparatus-user information, and as necessary compare the memory-card-user information with the old-apparatus-user information.

This makes it possible to automatically rewrite the existing memory-card-user information even when changing the apparatus-user information when transferring the memory card, for example, so it is possible to improve the convenience for the user.

On the other hand, when the comparison result when comparing the apparatus-user information with the main-memory-card-user information indicates no match, it is possible for a mail-transmission unit to send e-mail to an e-mail address that is contained in the main-memory-card-user information.

When the owner of the memory card reading/writing apparatus differs from the owner of the memory card, for example, when the user, who is the owner of the memory card reading/writing apparatus, inserts the memory card, the owner of the memory card is notified by e-mail that the memory card was used, so this makes it possible for the owner of the memory card to know the status of use of the memory card even at a remote location.

By including information in the e-mail about the user of the memory card reading/writing apparatus, for example address information, it is possible to specifically know who is using the memory card.

Furthermore, by equipping the apparatus with GPS, and including the current-location information that is obtained from GPS in the user information, it is also possible to know the location of the memory card even when it is lost.

Moreover, it is also possible to equip the memory card reading/writing apparatus with a mail-receiving unit that obtains apparatus-user information from the received mail that identifies the user of the other apparatus, such that the comparison unit compares the apparatus-user information of the other apparatus with the main-memory-card-user information, and outputs the comparison result, and an access-control unit controls access of the memory card based on that comparison result. By having the access-control unit control access of the memory card based on conditions of use that are included in the e-mail, it is possible to control access of the memory card remotely.

It is possible to include settings such as, 'use allowed', 'use not allowed', 'number of times use is allowed', 'transferring', 'period' in the conditions for use.

In this case, the memory card reading/writing apparatus that sends the aforementioned e-mail comprises: a use-authorization-information-generation unit that generates use-authorization information that includes apparatus-user information and conditions of use for the memory card that can be accessed by the apparatus at the transmission destination; and a mail-transmission unit that sends the use-authorization information that was generated by the use-authorization-information-generation unit to the apparatus at the transmission destination.

The memory card reading/writing apparatus can be materialized by a computer. In this case, operating a program on the computer can materialize the each unit mentioned above.

BRIEF DESCRIPTION OF THE DRAWINGS

FIG. 1 is a block diagram showing the functions when a PDA is used as the memory card reading/writing apparatus of this invention.

FIG. 2 is an image diagram of when a plurality of memory cards is used in a plurality of memory card reading/writing apparatuses.

FIG. 3 is a flowchart showing the processing by the memory card reading/writing apparatus of a first embodiment of the invention.

FIG. 4A and FIG. 4B are drawings showing the configuration of the apparatus-user information, main-memory-card-user information and sub-memory-card-user information of the first embodiment of the invention.

FIG. 5 is a table showing the comparison results.

FIG. 6A and FIG. 6B are drawings showing the configuration of the memory-card-contents-list information and file-list information.

FIG. 7A and FIG. 7B are drawings showing detailed examples of the apparatus-user information, including the apparatus-user information and e-mail address.

FIG. 8A, FIG. 8B and FIG. 8C are drawings showing detailed examples of the main-memory-card-user information, including the main-memory-card-user information and e-mail address.

FIG. 10 is a drawing showing a detailed example of the memory-card-contents-list information.

FIG. 14A and FIG. 14B are drawings showing the configuration of the memory-card-user information and log information.

FIG. 16A and FIG. 16B are drawings showing the configuration of the memory-card-user information and referenced-contents information.

FIG. 17A and FIG. 17B are drawings showing a detailed example of the log information and referenced-contents information.

FIG. 25A and FIG. 25B are drawings showing the configuration of and detailed example of the mail-transmission information.

FIG. 29 is a first flowchart showing the processing of the memory card reading/writing apparatus (use-authorization receiving side) of the third embodiment of the invention.

FIG. 30 is a second flowchart showing the processing of the memory card reading/writing apparatus (use-authorization receiving side) of the third embodiment of the invention.

FIG. 31A, FIG. 31B and FIG. 31C are drawings showing the configuration of and detailed example of the use-authorization information, and a table of the conditions of use.

FIG. 32A and FIG. 32B are drawings showing the configuration of and detailed example of the mail-transmission information.

DESCRIPTION OF THE PREFERRED EMBODIMENTS

Figure 9A:
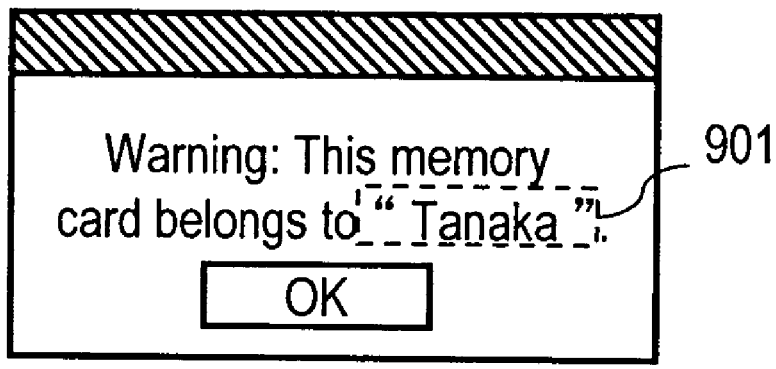
FIG. 9A and FIG. 9B are display examples of a notification (warning) and memory-card-contents-list information.

To better understand this invention, the preferred embodiments of the invention will be explained with reference to the supplied drawings. The embodiments described below are examples of embodiments of the invention, and do not limit the technological range of the invention. Also, in the embodiments described below, a PDA is used as an example of the memory card reading/writing apparatus, however, could be any apparatus that is capable of accessing a memory card. The invention can be applied to a memory card that is any kind of a portable recording medium.

Furthermore, in the embodiments described below, a memory card reading/writing apparatus that uses a contact-type access method for accessing the memory card is explained, however, the invention can also be applied to a memory card reading/writing apparatus that uses a contact-less access method. In this case, for the contact-type access method, access is possible when the memory card is inserted, and in the contactless access method, the memory card can be accesses when the memory card reading/writing apparatus perceives that access is possible. Moreover, in the contactless access method, when the memory card is removed, the connection with the memory card reading/writing apparatus is terminated by the software, for example.

[First Embodiment]

The process for connecting and using a memory card in the memory card reading/writing apparatus of a first embodiment of the invention is explained below.

FIG. 1 is a block diagram showing the functions when using a PDA as the memory card reading/writing apparatus 100. The memory card reading/writing apparatus 100 stores apparatus-user information 101 in a memory unit 108, and also comprises: an apparatus-user-information-acquisition unit 102, memory-card-user-information-acquisition unit 103, user-information-comparison unit 104, output unit 105, memory-card-list-acquisition unit 106 and log-information-writing unit 107. The processing by each of the units will be explained in detail as needed.

Also, FIG. 2 is an image diagram showing the detailed operation when a memory card that is used by more than one person is attached to the memory card reading/writing apparatus (PDA) 100.

In FIG. 2, the PDA 100 is connected to a removable memory card 120 and comprises: a display 203 for displaying display-information 202 to the user of the PDA 100, and control buttons 204 that control the PDA; and it stores apparatus-user information 101 that identifies the user of the PDA. Here, the user of the PDA 100 is 'Taro Yamada'.

Also, main-memory-card-user information 121 that identifies the main user of the memory card is stored in the memory card 120. Here, the main user of the memory card is 'Ichiro Tanaka'.

First, after the power to the PDA 100 is turned ON, the apparatus-user-information-acquisition unit 102 of the PDA acquires apparatus-user information 101 from the memory unit 108 that identifies the user of the PDA, and sends that information to the user-information-comparison unit 104 (FIG. 3: S301).

Next, the PDA 100 judges whether or not the memory card 120 has been inserted. Here, when the memory card 120 is detected, the memory-card-user-information-acquisition unit 103 acquires the main-memory-card-user information 121 from the memory card 120 that identifies the main user of the memory card 120, and sends that information to the user-information-comparison unit 104 (FIG. 3: S302). As shown in FIG. 4A, the apparatus-user information 101 contains a 4-byte user ID that indicates the number that identifies the user of the PDA, and a 64-byte user name that indicates the name of the user of the PDA. Similarly, the main-memory-card-user information 121 contains a 4-byte user ID 401 that indicates a number that identifies the main user of the memory card, and a 64-byte user name 402 that indicates the name of the user of the memory card.

Next, the user-information-comparison unit 104 compares the user ID 401 of the apparatus-user information 101 with the user ID 401 of the main-memory-card-user information 121, and sends the comparison result together with the apparatus-user information 101 and main-memory-card-user information 121 to the output unit 105 (FIG. 3: S303). The comparison result is expressed by 4-byte data as shown in FIG. 5, and when the comparison result indicates there is no match, the result is 'UNMATCH', which is assigned for a value of 1, and when the comparison result indicates a match, the is result is 'MATCH', which is assigned for a value of 0, and when there is no main-memory-card-user information, such as in the case of a new memory card, the result is 'NOTHING', which is assigned to a value of 2.

Next, when the comparison result is 'UNMATCH', the output unit 105 generates output information based on the main-memory-card-user information, and outputs that information for the user of the PDA (FIG. 3: S304, NO-->S306).

Also, when the comparison result is 'MATCH', the output unit 105 acquires memory-card-contents-list information 123, which gives a contents list on the memory card, from the memory card 120 via the memory-card-contents-list-information-acquisition unit 106, then generates output information based on the memory-card-contents-list information and outputs the output information to the user of the PDA (FIG. 3: S304, YES-->S305-->S306).

As shown in FIG. 6A, the memory-card-contents-list information contains 68-byte or greater file-list information 602 that gives a list of files for each file type, and the 4-byte file type number 601 that indicates the number of file lists. As shown in FIG. 6B, the file-list information further contains a 64-byte file-type name 603 that indicates the type of file, 128-byte file names 605 that indicate each of the file names, and 4-byte file number 604 that indicates the number of files.

Next, more detailed values will be used below to explain the processes described above. For example, when a memory card 120 is inserted in the PDA 100, first, as shown in FIG. 7A, the apparatus-user-information-acquisition unit 102 acquires apparatus-user information 101 having the values: User ID=0120 and User name=Yamada (FIG. 3: S301). Next, as shown in FIG. 8A, the memory-card-user-information-acquisition unit 103 acquires main-memory-card-user information from the memory card 120 having the values: User ID=0124 and User Name=Tanaka (FIG. 3: S302). In this situation, for some reason, Mr. Yamada is trying to read the information recorded on a memory card belonging to Mr. Tanaka.

Next, the user-information-comparison unit 104 compares the User ID '0120' if the apparatus-user information 101 with the User ID '0124' of the main-memory-card-user information (FIG. 3: S303). Here, the comparison result is 'UNMATCH', so the output unit 105 generates display information based on the main-memory-card-user information, and as shown in FIG. 9A, outputs information containing the name 'Tanaka' as the main user of the memory card to the display 203 of the PDA 100. An image of the output is as shown in the bottom left of FIG. 2. Here an example of using a display is explained, however, the output could also be audio output indicating that the memory card belongs to Mr. Tanaka. Moreover, an output that notifies (warns) that the main-memory-card-user information is different from the apparatus-user information is effective. In the case of this kind of message, when Mr. Yamada selects an OK button 205, it becomes possible to read the information recorded on the memory card belonging to Mr. Tanaka. That is, in addition to displaying the message, it becomes possible to access the information recorded on the memory card with no problem. After that, by using the functions of the PDA 100 it becomes possible to reference and reproduce the information on the memory card. Also, by removing the memory card according to a message, it is possible to judge that the memory card belongs to another person without accessing the information recorded on the memory card.

On the other hand, when apparatus-user information having the values, User ID=0120 and User name=Yamada, are acquired as shown in FIG. 7A, and main-memory-card-user information having the values, User ID=0120 and User name=Yamada, are acquired as shown in FIG. 8B, the comparison result is 'MATCH'. In this situation, Mr. Yamada is trying to read information recorded on his own memory card.

In this case, memory-card-contents-list information 1000 is acquired from the memory card and consists of two file-type names 1001 from the two types of file-list information 'SD-Audio' and 'SD-Video' as shown in FIG. 10, for example, and where 'SD-Audio' consists of two files, 'Black Cat Tango' 1002, and 'White Cat Waltz' 1003.

Figure 9B:

Next, the output unit 105 generates output information based on the acquired memory-card-contents-list information, and outputs a list of the contents of the memory card to the display 203 of the PDA 100 as shown in FIG. 9B. The image of the output is as shown at the bottom right of FIG. 2. That is, when the user of the PDA 100 matches the user of the memory card, there is no message (warning) output as described above. After that, by using the functions of the PDA 100, it becomes possible to reference and reproduce the information on the memory card.

By comparing the apparatus-user information with the main-memory-card-user information and outputting specific information (a warning, etc,) based on the comparison result as described above, it is possible to identify the owner of the memory card without checking in detail the contents of the memory card. Also, in comparison with the case of when absolutely no security is performed, it is possible to prevent accidentally reading the information recorded on the memory card.

Furthermore, even when the apparatus-user information does not match the main-memory-card-user information, it becomes possible to read, reference and reproduce the information that is recorded on the memory card, so in comparison with the case of performing stringent security, it is possible to perform operation smoothly even when the memory card is shared by more than one person.

Moreover, when the apparatus-user information matches the main-memory-card information, it is possible to promptly display a list of the contents of the memory card by way of the memory-card-contents-list information-acquisition unit when the memory card is inserted. Therefore, the user can easily check the contents of the memory card, or in other words, it is becomes possible to easily manage the data stored in the memory card.

Figure 11:
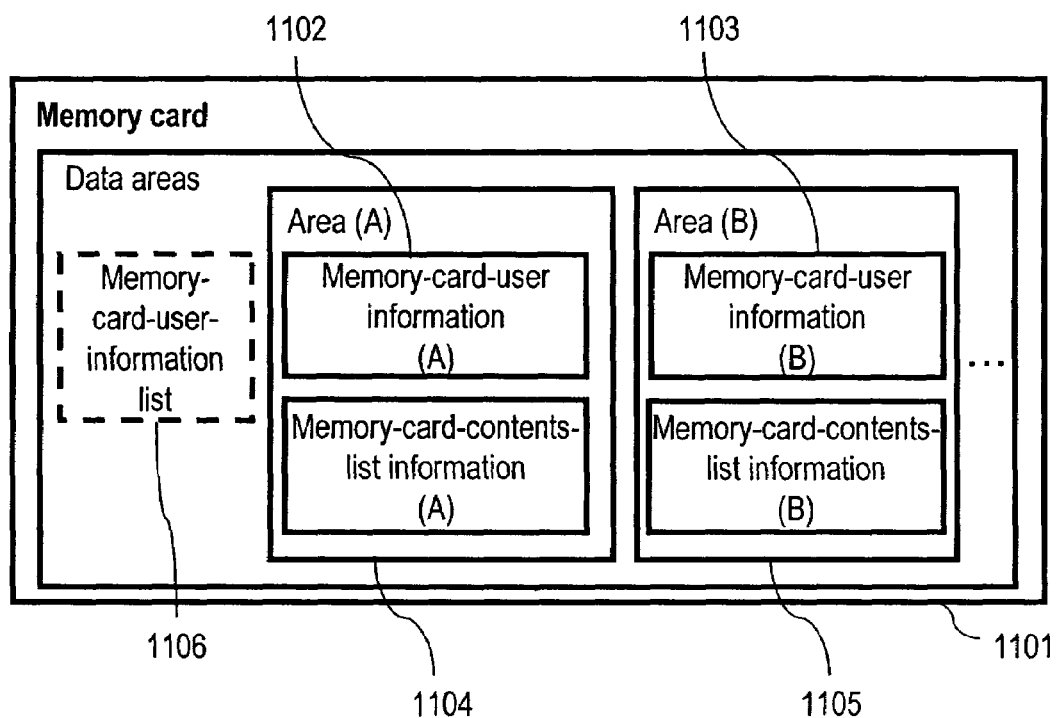
FIG. 11 is a drawing showing an image of a memory card that is partitioned into a plurality of sections.

Next, the case of when the memory card is partitioned into a plurality of user areas will be explained. FIG. 11 is an image of the memory card 1101 partitioned into a plurality of areas. That is, the memory card 1101 is partitioned into a plurality of areas, area (A) 1104 and area (B) 1105, which comprise memory-card-user information (A) 1102 and memory-card-user information (B) 1103, respectively. The areas referred to here, can be logically partitioned, for example, can be partitioned into folder units.

Figure 12:
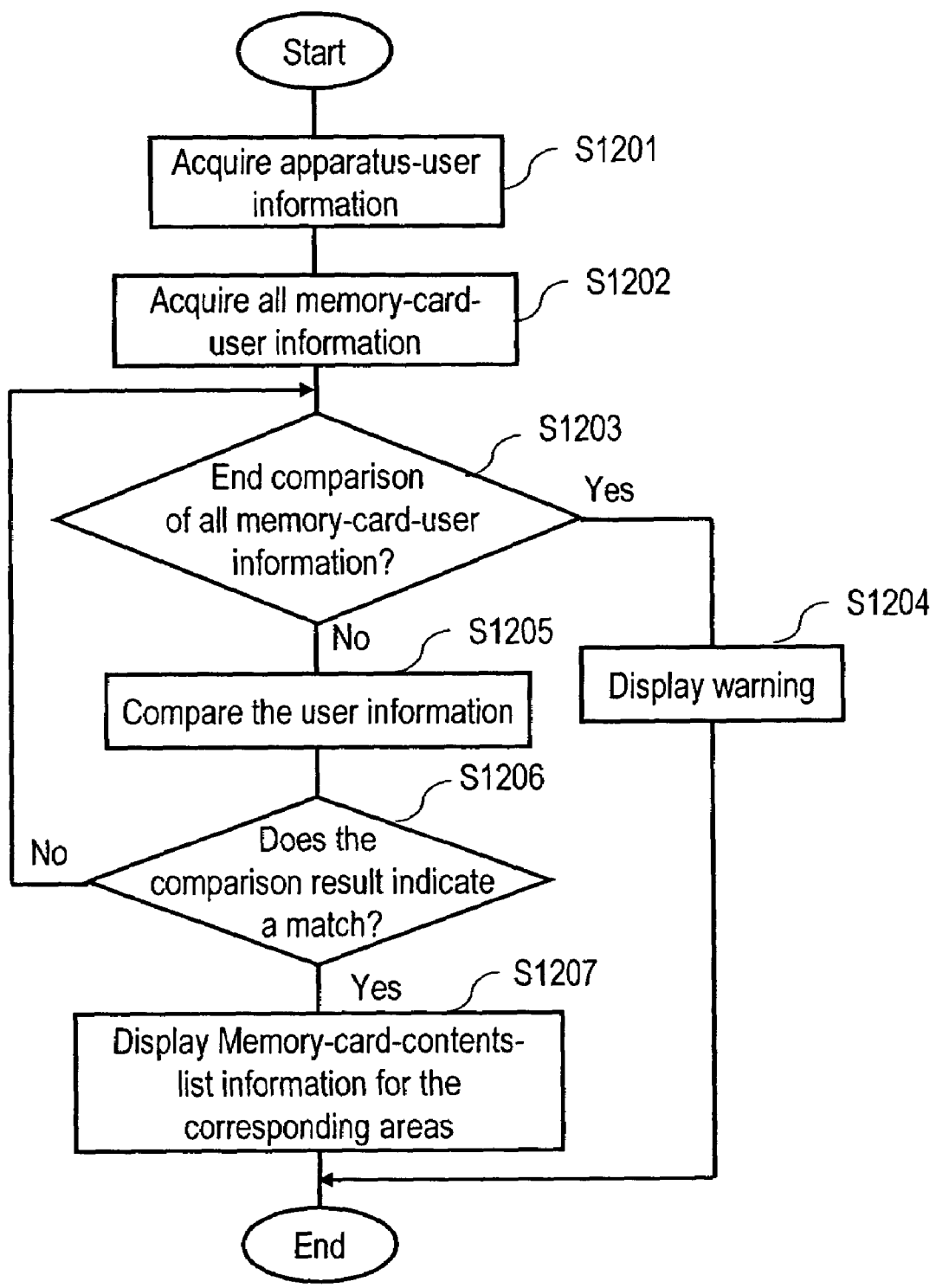
FIG. 12 is a flowchart showing the processing when the memory card is partitioned into a plurality of sections.

When this kind of memory card 1101 is inserted into the PDA 100, first, the user-information-comparison unit 104 acquires apparatus-user information by way of the apparatus-user-information-acquisition unit 102 (FIG. 12: S1201). Also, the user-information-comparison unit 104 further acquires memory-card-user information from the memory card 1101 for each area by way of the memory-card-user-information-acquisition unit 103 (FIG. 12: S1202). When there is a memory-card-user-information list 1106 that relates the memory-card-user information in the memory card 1101 to areas that correspond to that information, it is possible to acquire that memory-card-user-information list.

Next, the user-information-comparison unit 104 judges whether or not the apparatus-user information has been compared with all of the acquired memory-card-user information (FIG. 12: S1203).

Here, when all comparisons have not been completed, the user-information-comparison unit 104 compares the apparatus-user information with the memory-card-user information (FIG. 12: S1203, NO-->S1205). Furthermore, when the comparison result is a match, memory-card-contents-list information of the corresponding areas is acquired and displayed on the display by way of the output unit 105 (FIG. 12: S1206, YES-->S1207).

When the comparison result is that there is no match, comparison is performed with different memory-card-user information (FIG. 12: S1206, NO-->S1203). Here, when there are no matches even after all of the memory-card-user information has been compared with the apparatus-user information, a warning display as described above, or processing related to mild security to be described later, is performed (FIG. 12: S1203, YES-->S1204-->End).

By comparing all of the memory-card-user information on the memory card with all of the apparatus-user information as described above, it is possible for the user automatically obtain the information in his/her own usable area by simply inserting the card. This makes it possible to improve convenience when a large number of users use a large-capacity memory card.

When there is more than one area for the same user, processing can be performed each time the area (folder) is changed, for example, or it is possible to store in memory the comparison results obtained when the memory card was inserted. Moreover, in the case of an attempt to access another user's area, it is possible to perform processing related to the mild security described above or that will be described later.

By the way, if having read information doesn't come to light to the owner of the memory card, even when the output (warning, etc.) described above is performed, there will probably be users that will read information with no resistance. In order to cope with this case, it is possible to add the function described below. The same numbers will be given to each of the steps shown in FIG. 13 that are the same as in the process shown in FIG. 3.

In the example described above, when the comparison result of the user IDs of the PDA 100 and the memory card 120 was 'UNMATCH', the name of the main user of the memory card was displayed on the display 203 of the PDA 100. Here, the apparatus-user information 101 will be left on the memory card at the same time.

Figure 13:
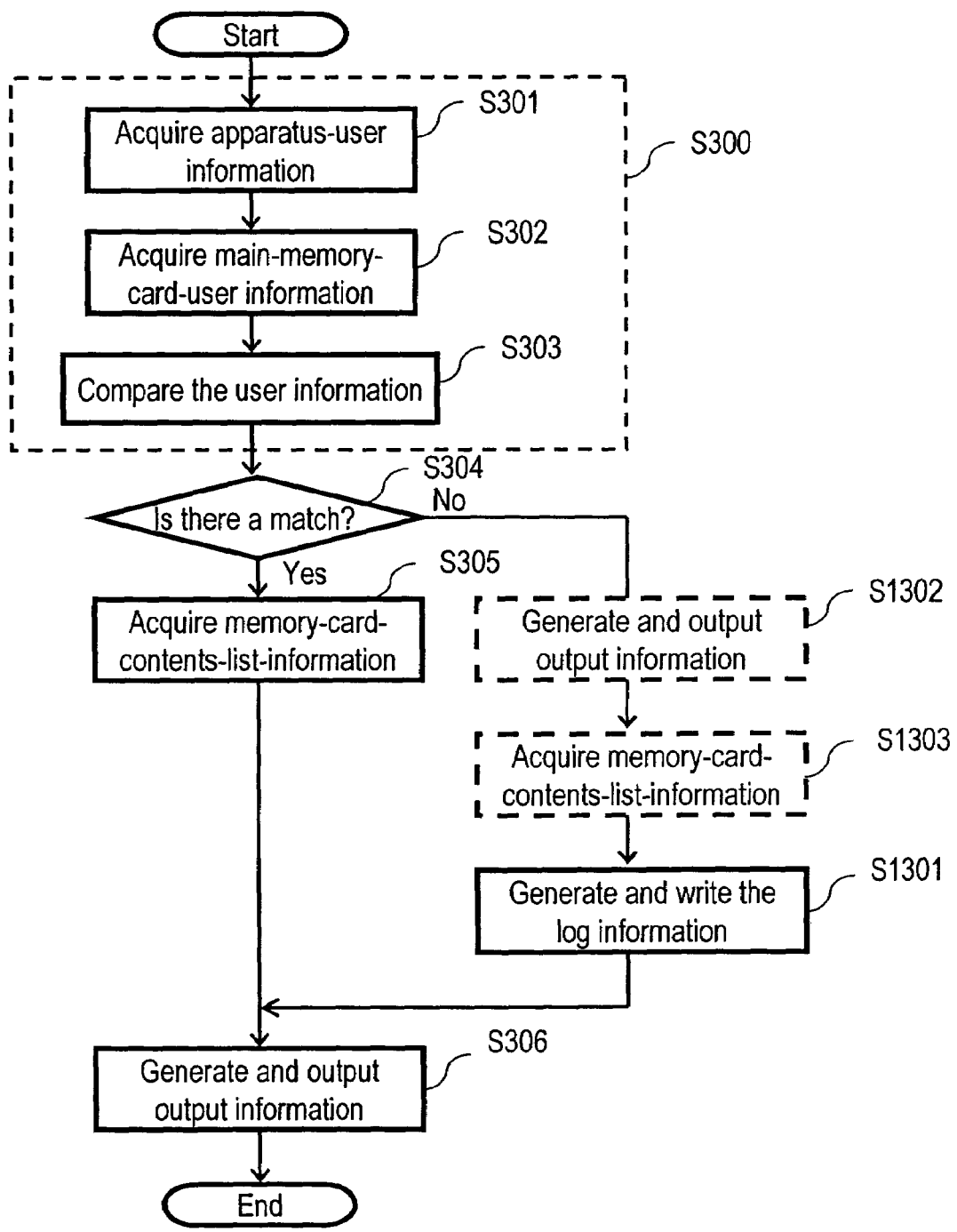
FIG. 13 is a flowchart showing the processing of the memory card reading/writing apparatus when generating log information.

In other words, in this case, when the user ID of the acquired apparatus-user information 101 is compared with the user ID of the main-memory-card-user information 121 and the comparison result is 'UNMATCH', the output unit 105 outputs the apparatus-user information 101 to the log-information-writing unit 107 (FIG. 13: S303-->S304, NO).

The log-information-writing unit 107 receives the apparatus-user information generates memory-card-user information 1401 that shows a log of use of the memory card 120 based on that apparatus-user information and the date/time acquired from the timer (not shown in the figure) of the PDA 100, and adds it to the log information 122 for the memory card 120 (FIG. 13: S1301).

The memory-card-user information 1401 is represented by the data configuration as shown in FIG. 14A, and comprises: a 4-byte user ID 1402 that is the number that identifies the user of the PDA 100, a 64-byte user name 1403 that shows the name of the user of the PDA 100, and 128-byte date/time-of-use data 1404 that shows the date and time the memory card was used.

The log information 122 is expressed by data configuration as shown in FIG. 14B, for example, and comprises: zero or more items of memory-card-user information 1401, and 4-byte memory-card-user-number data 1405 showing the number of memory-card users.

Next, the processing described above will be explained using detailed values. When the user of the PDA 100 inserts the memory card 120 into the PDA 100, first, apparatus-user information having the values, User ID=0120 and User name=Yamada, is acquired as shown in FIG. 7A, and main-memory-card-user information having the values, User ID= 1024 and User name=Tanaka, is acquired as shown in FIG. 8A (FIG. 13: S301 to S302).

Next, the user-information-comparison unit 104 compares the User ID '0120' of the apparatus-user information with the User ID '0124' of the main-memory-card-user information, and the comparison result is 'UNMATCH' (FIG. 13: S303-->S304, NO).

It is assumed here that the memory-card-user information, showing that a user having user ID=0122 and whose user name is 'Sato' used the memory card on 2002/3/1 at 10:30, was registered in the log information 1501 beforehand.

Figures 15A, 15B:
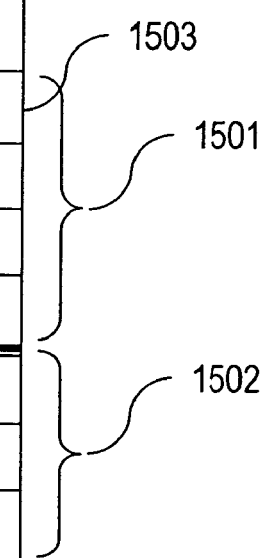
FIG. 15A and FIG. 15B are drawings showing a detailed example of the memory-card user information and log information.

Based on the comparison result, 'UNMATCH', the output unit 105 outputs the apparatus-user information to the log-information-writing unit 107. The log-information-writing unit 107 creates memory-card-user information as shown in FIG. 15A and adds it as new memory-card-user information 1502 as shown in FIG. 15B. Also, '1' is added to the number of memory-card users (1405, 1503) of the log information 122. The apparatus-user information for Mr. Yamada is written in the log information for the memory card in this way. Therefore, when Mr. Tanaka looks at the log information for that memory card at later date, it is possible for him to check whether Mr. Yamada has referenced the information stored on the memory card.

When the owner of the memory card reading/writing apparatus differs from the owner of the memory card as described above, it is possible to record log information on the memory card that includes apparatus-user information for the apparatus that accessed the memory card. Therefore, it is possible for the owner of the memory card to know when other people used the memory card.

Also, when using a memory card for an operation such as a circulating bulletin where information about the circulation progress is necessary, by recording the log information, it is possible to automatically know the progress of circulation. It is preferred that the log information be encoded and stored or be saved in a secure area of the memory card.

Figure 18A:
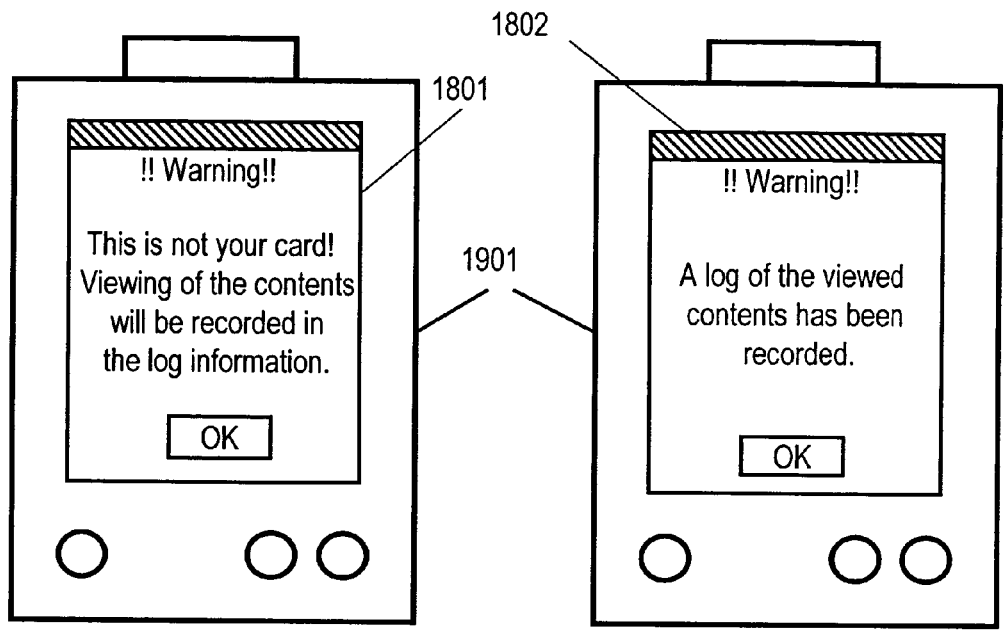
FIG. 18A, FIG. 18B and FIG. 18C are drawings showing display examples of a warning message, display of the log information including the referenced-contents information, and the display when the backlight is OFF.

In the case when the owner of the memory card reading/writing apparatus differs from the owner of the memory card, in addition to the memory-card-user information described above, it is also possible to add referenced-contents information to the log information that shows which contents were referenced. In this case, when a user reads specific contents from the memory card 120, a warning is displayed to the user such as shown in the display 1801 of FIG. 18A for example. When the user ignores this warning and reads the contents, the log-information-writing unit 107 generates log information, and in the writing process S1301, adds the name of the read contents, the date and time, and the number of times to the log information 122. After the information has been added, a display indicating that a log of the referenced contents has been saved on the memory card is displayed as shown in display 1802.

When adding referenced-contents information to the log information, the memory-card-user information 1601 contained in the log information is expressed with a data configuration as shown in FIG. 16A. That is, the memory-card-user information 1601 contains the start address of the referenced-contents information, which has been added to the memory-card-user information shown in FIG. 14A. The start address of the area, where the referenced-contents information 1603 shown in FIG. 16B is saved, is stored in the start address 1602 of the referenced-contents information. Moreover, the referenced-contents information 1603 comprises: a 128-byte file name 1604 that is the file name of the contents read by the user corresponding to the user ID 1402, a 64-byte file type name 1605 that indicates the type of contents, 128-byte date/time-of-last-use data 1606 that indicates the date and time when the file was read last, 4-byte reference count 1607 that indicates the count of the contents have been referenced, and 4-byte start-address-of-next-referenced-contents-information 1608 that is the start address of the next referenced-contents information.

A detailed example of referenced-contents information added to the log information is shown in FIG. 17A. In FIG. 17A, the start addresses 1701, 1702 for the referenced-contents information for each user ID is added to the log information shown in FIG. 15B. The start address of the area where the referenced-contents information corresponding to the respective user ID is saved as shown in FIG. 17B, is stored in the start address of the referenced-contents information. More precisely, it is possible to reference the related referenced-contents information 1703 based on the value '1001' that is stored in the start address 1702 of the referenced-contents information for user ID '0120'.

The referenced-contents information 1703 comprises: the file name 1704 of the contents read by the user corresponding to the user ID, the file type name 1705 that shows the type of contents, the date/time of last use 1706 that shows the date and time when the file was last read, the reference count 1707 that indicates the number of times the contents have been referenced, and the start address 1708 of the next referenced-contents information. Also, based on the start address 1708 of the next referenced-contents information, it is possible to reference the referenced-contents information for different contents.

By saving in memory referenced-contents information for the referenced-contents in addition to the memory-card-user information as described above, it is possible for the owner of the memory card to know which contents have been referenced. Therefore, in the case the memory card is accidentally lost and then found, it is possible to take appropriate action based on the referenced contents.

Figure 18B:
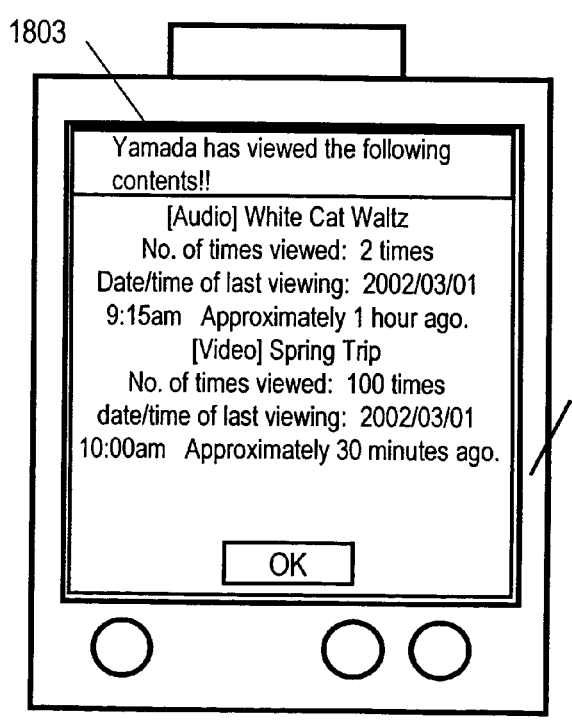

The referenced-contents information can be displayed to the owner of the memory card as shown in the display 1803 of FIG. 18B by using a log-display unit (not shown in the figure) or the like of the PDA 1901. The name of the user who referenced the contents, the file name of the referenced-contents, the file type name, the date/time of last use, and the number of times referenced are displayed in the display.

When the owner of the memory card reading/writing apparatus differs from the owner of the memory card, it is possible to include information in the information, which is output by the output unit on the display, indicating that if the information on the memory card is read, a log will be generated, or in other words, information (for example, warning information) indicating that a log of reference of the memory card will be created. By including this kind of information, it is possible to strengthen security from a psychological aspect when another user reads information from the memory card. Of course, for a user that has proper authorization, this is not a form of psychological security, so it does not hinder smooth operation.

When the information indicating that a log will be generated is displayed, step S1302, 'generation and output of output information' by the output unit, and step S1303, 'acquisition of memory card information', are executed before step S1301 in FIG. 13. Step S1302 is output that includes the information indicating that log information will be generated, and by removing the memory card at this point, no log information will be left on the memory card and no information will be read from the memory card. By ignoring the warning and selecting the 'OK' button for example, step S1303, 'acquisition of memory-card-contents-list information', and step S1301, 'generation and writing of log information', will be executed, or in other words, the information on the memory card is read and log information is saved.

Above, a function of recording a log was explained as a function for preventing a user other than the owner from easily referencing the contents of a memory card, however, it is also possible to add a function as described below.

Figure 18C:
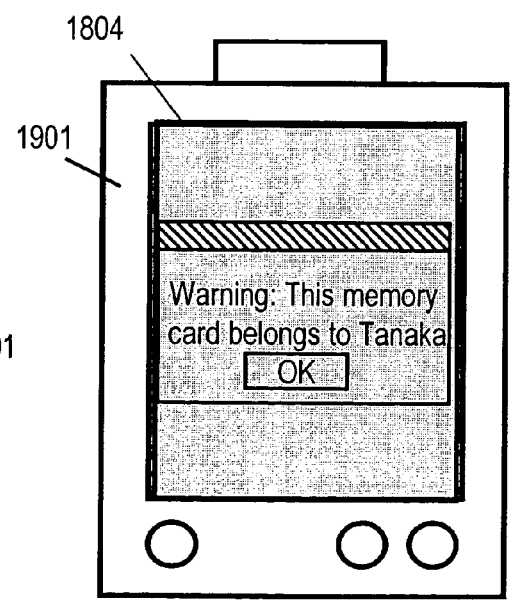

That is, when the user-information unit 104 compares the apparatus-user information with the main-memory-card-user information and they do not match, the function-restriction unit 1905 receives a notification of that, and turns OFF the backlight for example, which is a function for making it easy to see the display of the PDA 1901. An image of the display when the backlight is OFF is shown in FIG. 18C. The backlight of the display 1804 of the PDA 1901 goes OFF and it becomes difficult to reference the contents displayed on the display. In this way, it is possible to make it difficult for the user to reference the display contents, and as a result increase the mild security function.

Even when the backlight is not turned OFF, the function-restriction unit 1905 can perform processes like the examples below to increase the mild security function.

Process of lowering the brightness of the display

Process of lowering the processing speed of the CPU (Central Processing Unit) of the PDA Process of adding a warning or display (overlay) to the normal display that makes it difficult to reference the normal display Process of sounding a buzzer periodically or constantly By performing a process for lowering the functions of the PDA with this kind of function-restriction unit, the convenience of the PDA 1901 is lowered and thus it is possible to improve the mild security function.

By the way, it is also possible to store sub-memory-card-user information, that is information of users allowed to use (read or write, for instance) information on the memory card, in addition to the main-memory-card-user information on the memory card 120, and to have the user-information-acquisition unit 103 also read that sub-memory-card-user information. The user-information-comparison unit 104 also compares this sub-memory-card-user information with the apparatus-user information 101. The sub-memory-card-user information is shown in FIG. 4B. The number of usable user IDs 405, and 4-byte user IDs 406 equal to the number of usable user IDs are stored in the sub-memory-card-user information. Needless to say, it is also possible to add user names that correspond to the user IDs 406.

With this configuration, by recording the members of a group that can used the memory card, for example, in the sub-memory-card-user information, it becomes possible for the users recorded in that sub-memory-card-user information to use the memory card without any warnings. In other words, by using the sub-memory-card-user information registered on the memory card, it becomes possible for a user group to use the memory card, so members of the user group are allowed to have free access, and it is possible to easily set mild restrictions for others. Here, it is also possible to handle the sub-memory-card-user information as prohibited-user information of users that are not allowed to use the memory card. In that case, when users corresponding to the sub-memory-card-user information use the memory card, use is possible with the mild security described above. Furthermore, it is also possible to change the contents of the warning display for each item of sub-memory-card-user information, or to output audio data for different warnings.

[Second Embodiment]

Figure 19:
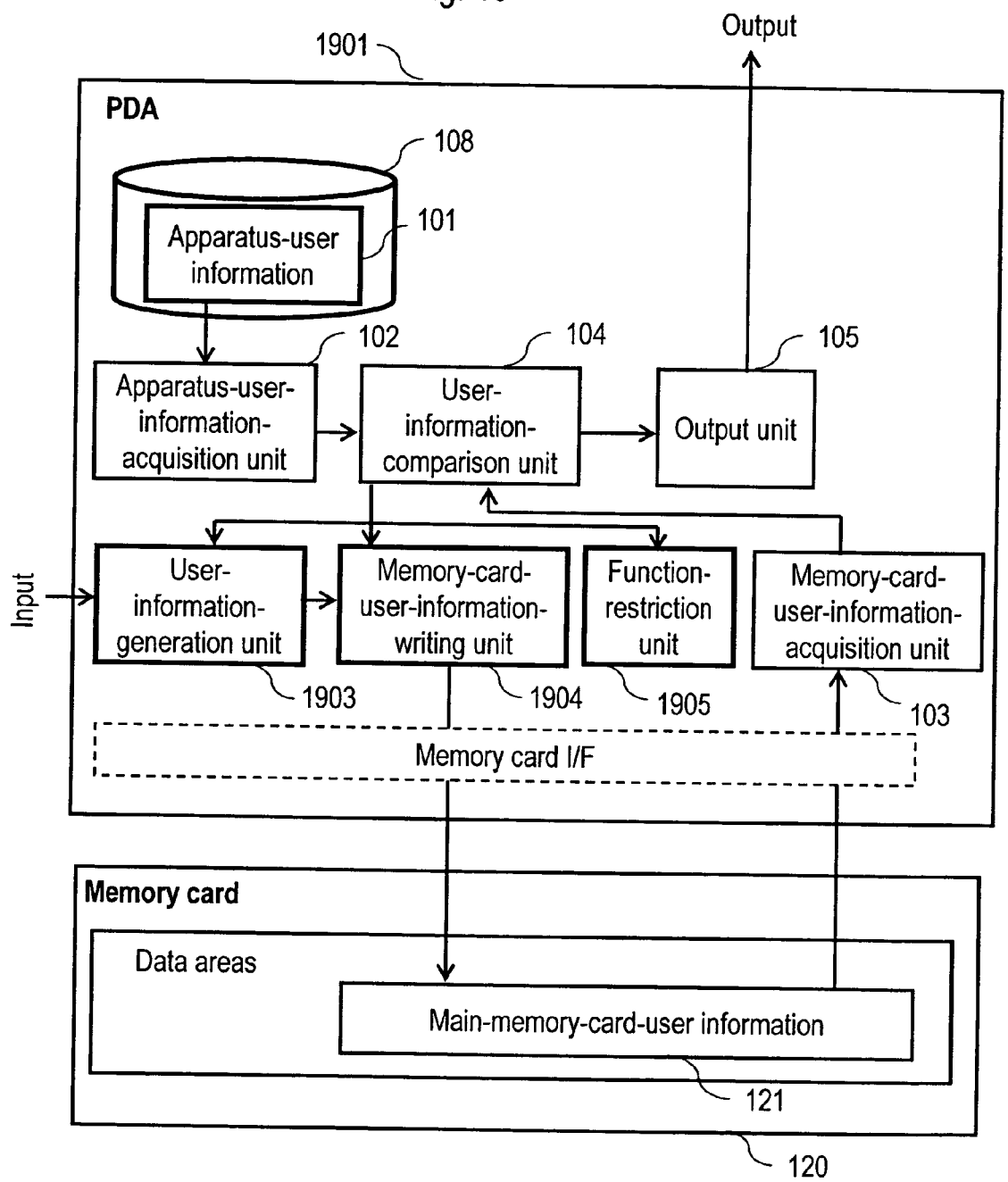
FIG. 19 is a block diagram showing the functions of the memory card reading/writing apparatus of a second embodiment of the invention.

Next, the memory card reading/writing apparatus of a second embodiment of the invention will be explained. The memory card reading/writing apparatus (PDA 1901) of this second embodiment is capable of rewriting the main-memory-card-user information based on specific conditions. As shown in FIG. 19, in addition to the construction of first embodiment, the PDA 1901 comprises a user-information-generation unit 1903 and a memory-card-user-information-writing unit 1904.

Figure 20:
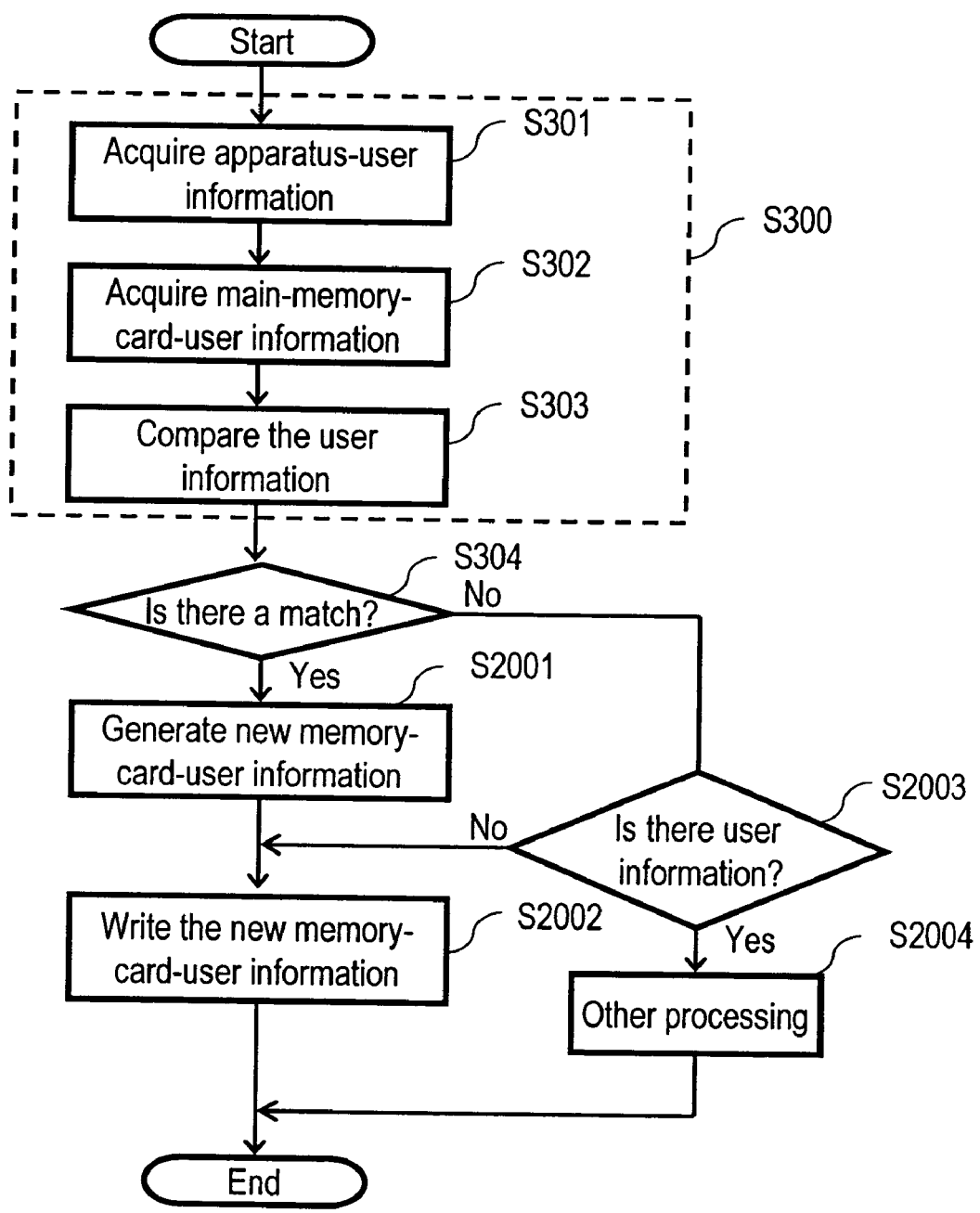
FIG. 20 is a flowchart showing the processing of the memory card reading/writing apparatus of the second embodiment of the invention.

First, similar to the first embodiment, when the user inserts the memory card 120 into the PDA 1901, the PDA 1901 acquires the apparatus-user information 101 and main-memory-card-user information 121, then the user-information-comparison unit 104 compares the two kinds of information (FIG. 20: S300).

Here, when the apparatus-user information 101 matches with the main-memory-card-user information 121, the user-information-comparison unit 104 notifies the user-information-generation unit 1903 that there was a match (FIG. 20: S304 YES).

Figure 21:
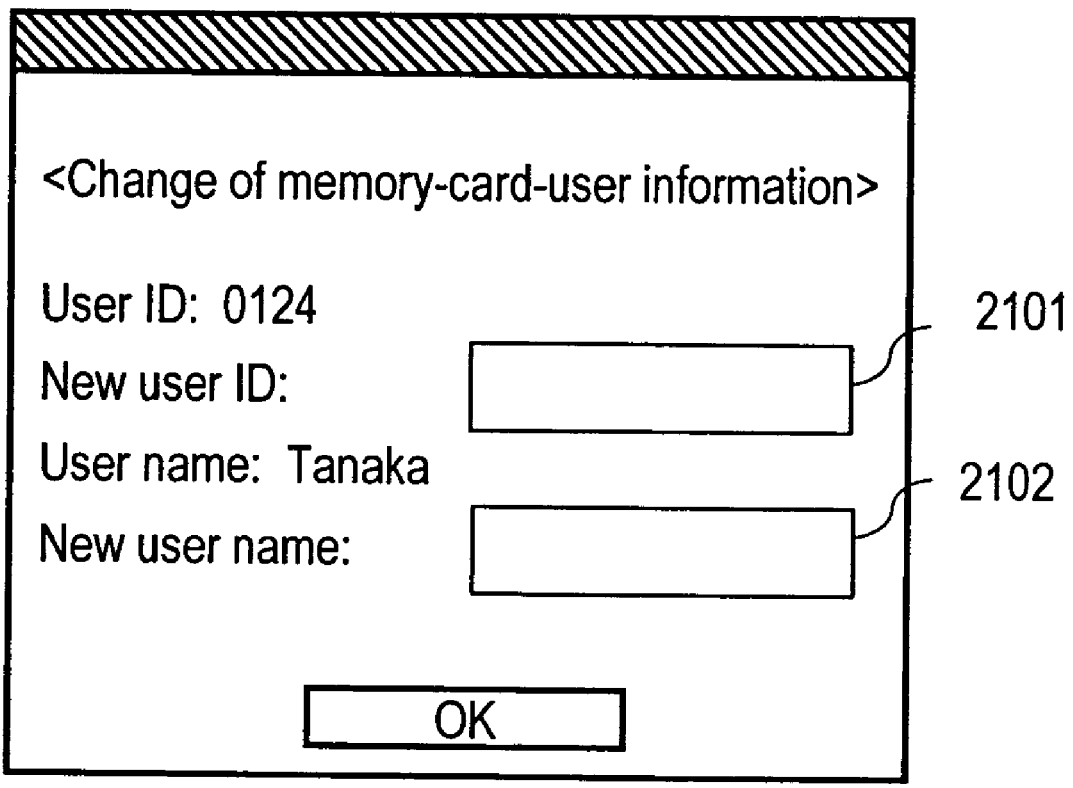
FIG. 21 is a drawing of a display example when requiring the input of the new user ID and new user name.

Next, the user-information-generation unit 1903 receives the notification indicating a match and outputs a display as shown in FIG. 21 to the display of the PDA 1901. Here, that display contains a dialog box asking the user of the PDA 1901 to input the new user ID 2101 and the new user name 2102.

When the user enters the new user ID 2101 and the new user name 2102 in response to this display, the user-information-generation unit 1903 receives that input information, and the memory-card-user-information-writing unit 1904 writes that information on the memory card 120 as main-memory-card-user information (FIG. 20: S2001-->S2002).

Since it is only possible for the user to rewrite the main-memory-card-user information for his/her own memory card, it becomes possible to easily transfer the memory card to another user while at the same time maintain the mild security. As a result, it is possible to promote distribution of the contents using the memory card.

When the apparatus-user information 101 does not match the main-memory-card-user information 121, and the main-memory-card-user information is 'NULL' for example, the memory card is regarded as being a new memory card, and the memory-card-user-information-writing unit 1904 writes the apparatus-user information 101 on the memory card 120 as the main-memory-card-user information (FIG. 20: S304, NO-->S2003, NO-->S2002).

When the apparatus-user information 101 does not match the main-memory-card-user information 121, but there is some information stored in the main-memory-card-user information 121, other processing is performed (FIG. 20: S304, NO-->S2003, YES-->S2004). Here, this other processing is the process of step S304 (NO) to step S306 of the first embodiment, for example.

Furthermore, it is possible to select the new user ID 2101 and new user name 2102 from the sub-memory-card-user information that was described in the first embodiment. In that case, not only is input easy, but since it is possible for the user to rewrite the main-memory-card-user information of his/her own memory card with other user information of a trusted pre-registered user, such as a specific group member, for example, it is possible to avoid accidentally distributing personal information, and it becomes possible to easily transfer the memory card to others.

By writing the main-memory-card-user information without entering it into a dialog box that requests input of the new user ID and new user name, it is possible to distribute the memory card to an unlimited number of users without any kind of mild security, just as in the case of a newly purchased memory card.

The process described above does not consider change the apparatus-user information 101. In other words, when the apparatus-user information 101 is changed due to transferring the memory card, it is necessary to change all of the main-memory-card-user information in order to use the existing memory card. This becomes a very troublesome task for a user that owns many memory cards.

Therefore, the PDA 1901 it is an apparatus that can store a plurality of items of apparatus-user information. In other words, when new apparatus-user information is registered in the PDA 1901 for example, the user-information-generation unit 1903 asks the user by way of a display on the display whether or not to save the old apparatus-user information. Here, when the user in response to the request selects to save the old apparatus-user information, the user-information-generation unit 1903 saves the old apparatus-user information in a memory unit (not shown in the figure), then registers the new apparatus-user information as the apparatus-user information. With this process, new-apparatus-user information and old-apparatus-user information are saved in the PDA 1901. It is possible to save as many items of old-apparatus-user information as desired.

When the user selects not to save the old-apparatus-user information, the old-apparatus-user information is deleted and not saved in the PDA 1901.

Figure 22:
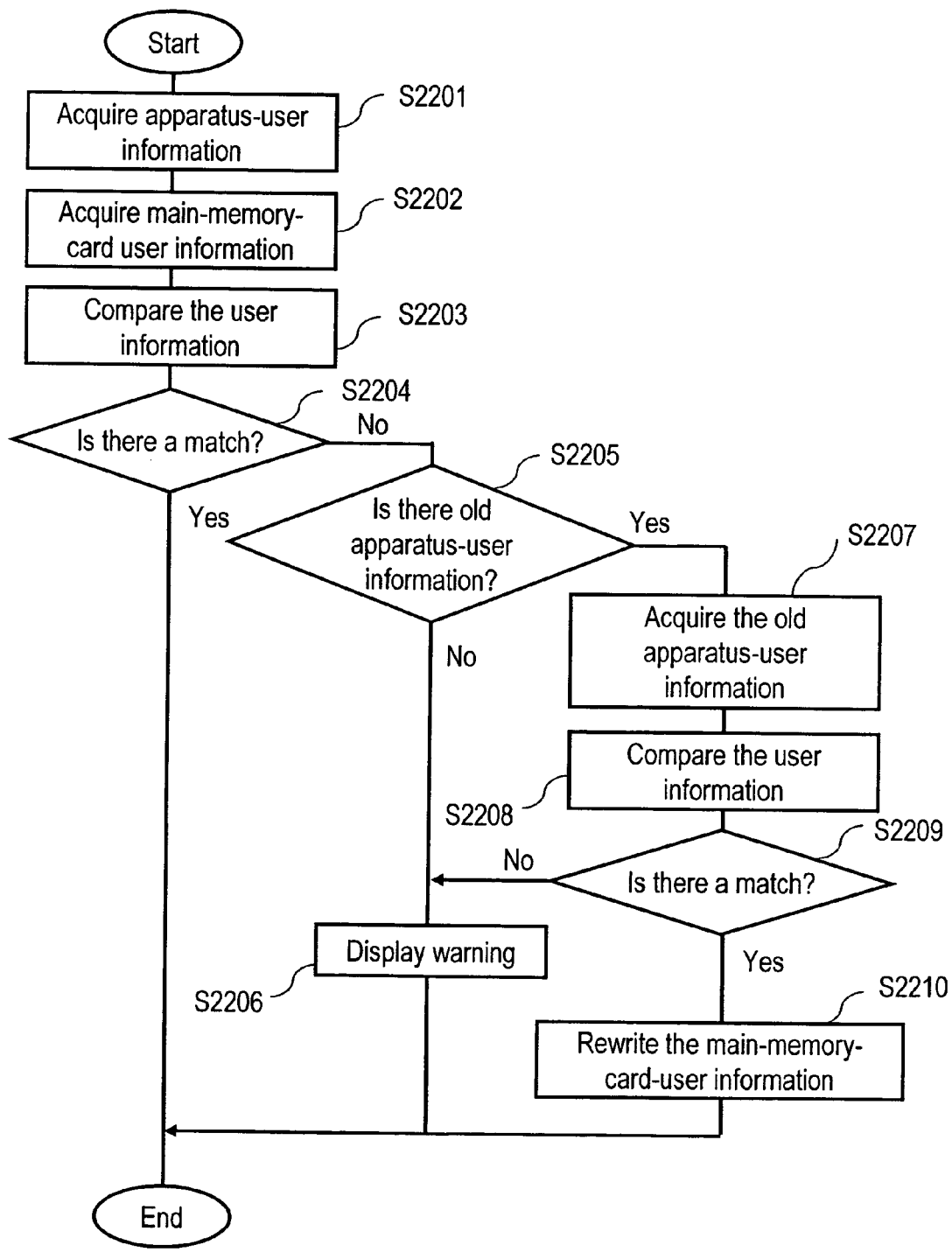
FIG. 22 is a second flowchart showing the processing of the memory card reading/writing apparatus of the second embodiment of the invention.

Next, when the memory card 120 is inserted into the PDA 1901, the user-information-comparison unit 104 acquires the apparatus-user information by way of the apparatus-user-information-acquisition unit (FIG. 22: S2201). The apparatus-user information referred to here is the new-apparatus-user information. Also, the memory-card-user-information-acquisition unit 103 acquires the main-memory-card-user information 121 from the memory card 120 (FIG. 22: S2202). Next, the user-information-comparison unit 104 compares the two kinds of user information and judges whether or not they match (FIG. 22: S2203).

In the case that they match, the user of the PDA 1901 is able to use the memory card 120 with no problems (FIG. 22: S2204, YES-->End).

However, in the case that they do not match, the user-information-comparison unit 104 further judges whether or not there is old-apparatus-user information (FIG. 22: S2204, NO-->S2205). In the case that there is no old-apparatus-user information, a warning message is displayed as shown in FIG. 9A, for example, and after that log information is saved as described above (FIG. 22: S2205, NO-->S2206-->End).

Furthermore, when there is old-apparatus-user information, the user-information-comparison unit 104 acquires the old-apparatus-user information by way of the apparatus-user-information-acquisition unit 102, and once again judges whether it matches with the main-memory-card-user information (FIG. 22: S2205, YES-->S2207-->S2208).

Here, when the old-apparatus-user information matches with the main-memory-card-user information, the memory-card-user-information-writing unit 1904 writes the apparatus-user information on the memory card 120 as the main-memory-card-user information (FIG. 22: S2209, YES-->S2210). The apparatus-user information referenced here is the new-apparatus-user information. After this, the user of the PDA 1901 can use the memory card 120 with no problem.

When the apparatus-user information does not match the main-memory-card-user information, a warning is displayed as before, and after that log information is saved (FIG. 22: S2209, NO-->S2206-->End).

In the above description, when there is old-apparatus-user information saved, and the apparatus-user information (newapparatus-user information) does not match with the main-memory-card-user information, the old-apparatus-user information is compared. In this way, even when the apparatus-user information changes by transferring the memory card or the like, the existing user information for the memory card is automatically rewritten, or in other words, it becomes possible to reduce the amount of work for the user to rewrite the main-memory-card-user information.

[Third Embodiment]

Figure 23:
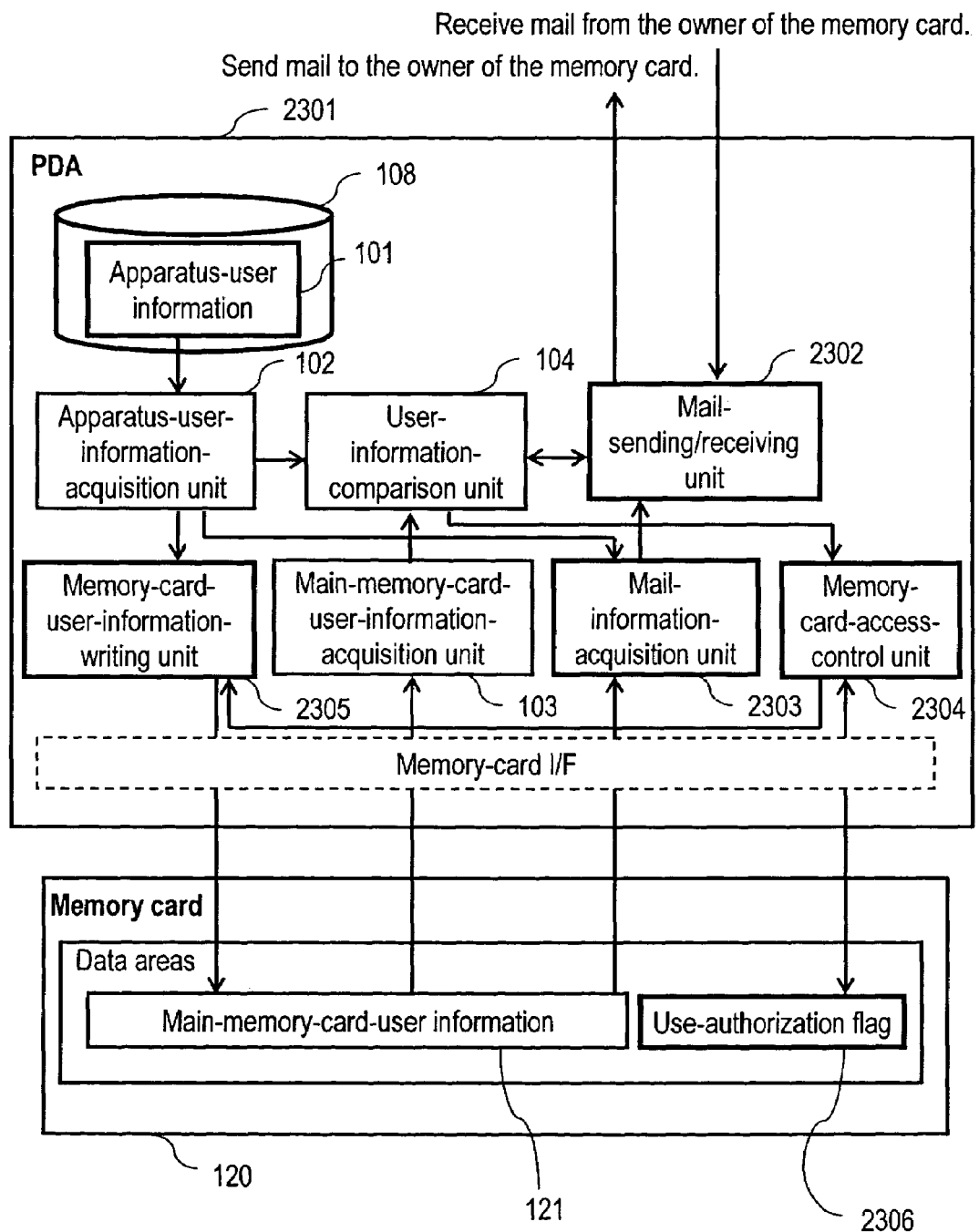
FIG. 23 is a block diagram of the functions of the memory card reading/writing apparatus (use-authorization receiving side) of a third embodiment of the invention.

Next, the memory card reading/writing apparatus of a third embodiment of the invention will be explained. The memory card reading/writing apparatus (PDA 2301) of this third embodiment makes it possible for the owner of a memory card in a remote location to know the current status of the memory card. As shown in FIG. 23, in addition to the construction of the first embodiment, the PDA 2301 comprises a mail-sending/receiving unit 2302 and a mail-information-acquisition unit 2303.

Figure 24:
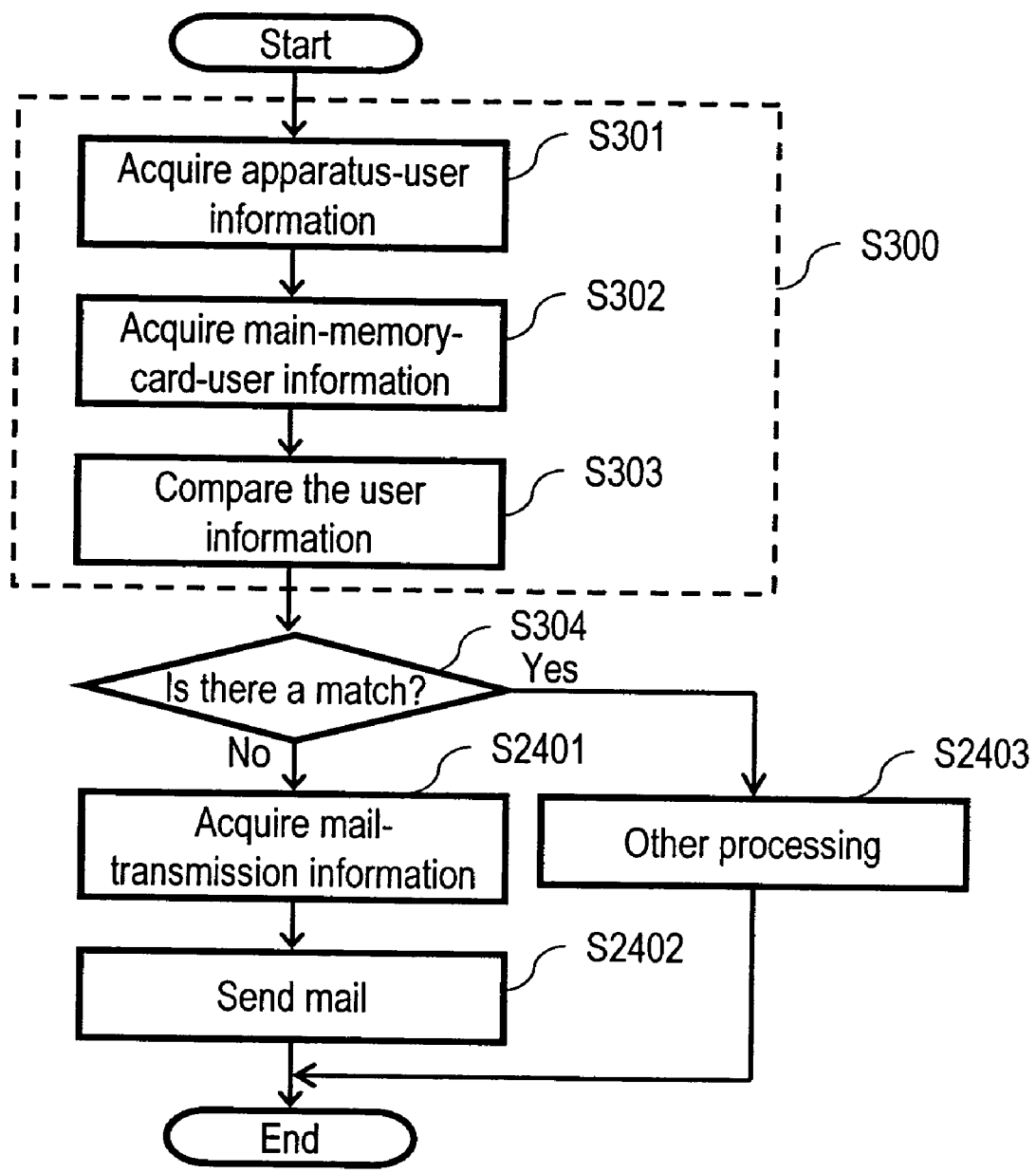
FIG. 24 is a flowchart showing the processing of the memory card reading/writing apparatus of the third embodiment of the invention.
Figure 26:
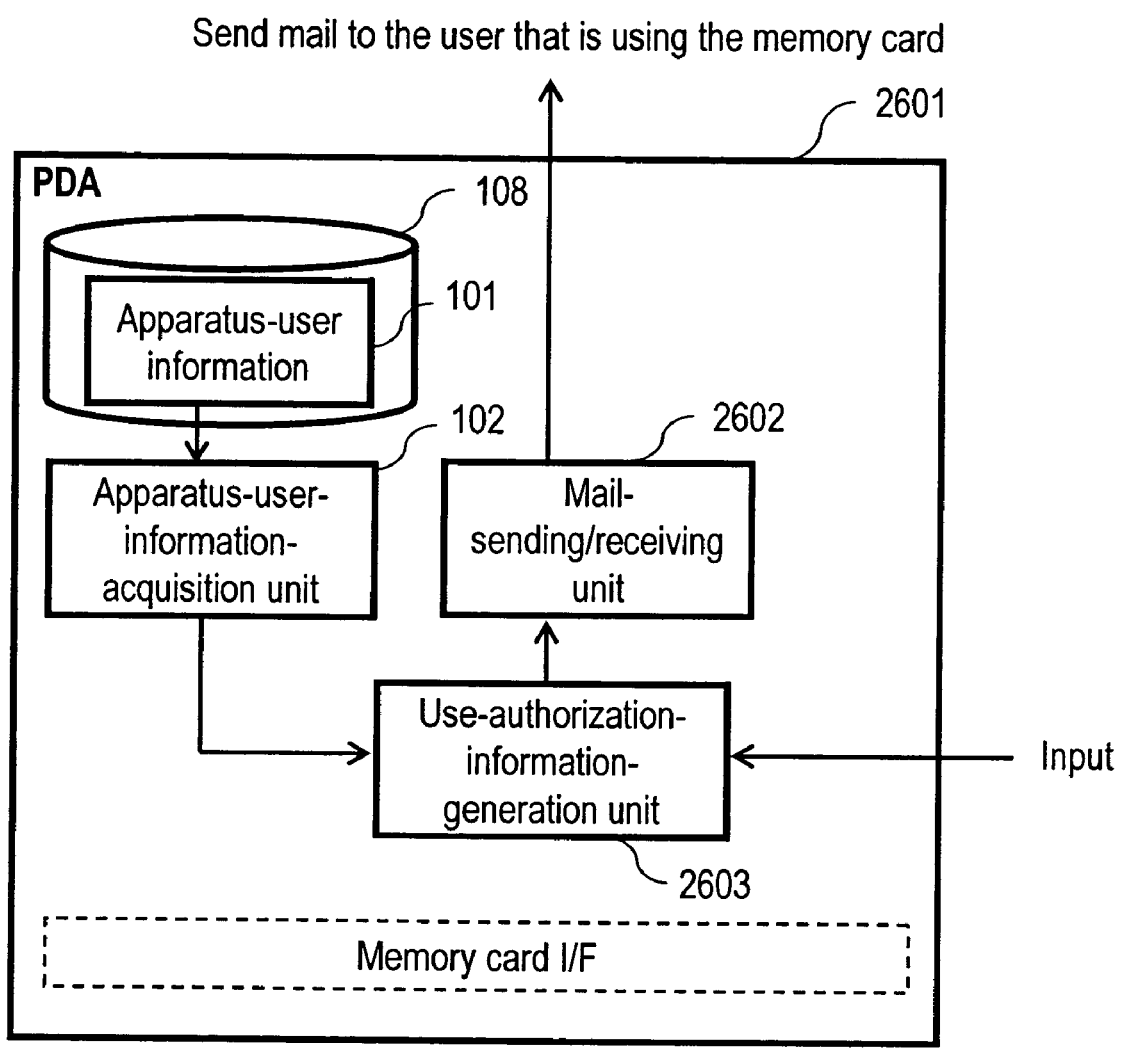
FIG. 26 is a block diagram of the functions of the memory card reading/writing apparatus (use-authorization sending side) of the third embodiment of the invention.

First, similar to the first embodiment, when the user inserts the memory card 120 into the PDA 2301, the PDA 2301 acquires the apparatus-user information 101 and the main-memory-card-user information 121, and then the user-information-comparison unit 104 compares the two kinds of information (FIG. 24: S300).

Here, when the apparatus-user information 101 matches the main-memory-card-user information 121, the PDA 2301 performs other processing (FIG. 24: S304, YES-->S2403). The other processing is a process such as that of step S304 (YES) to step S306 of the first embodiment.

Moreover, when the apparatus-user information 101 does not match the main-memory-card-user information 121, the user-information-comparison unit 104 sends information indicating there was no match to the mail-sending/receiving unit 2302 (FIG. 24: S304, NO).

The mail-sending/receiving unit 2302 receives the information indicating there was no match, and then acquires apparatus-user information as shown in FIG. 7B from the memory unit 108 by way of the mail-information-acquisition unit 2303, and as shown in FIG. 25A, that information contains the mail address 2502 of the source from which mail is to be sent, apparatus-user name 2506, and address information 2507 (FIG. 24: S2401). Similarly, the mail-information-acquisition unit 2303 acquires the subject 2504 from the memory unit 108 as shown in FIG. 25A. Here, the mail address 2502 is the e-mail address of the owner of the PDA 2301, and the address information 2507 is the address of the owner of the PDA 2301.

Also, the mail-sending/receiving unit 2302 acquires the e-mail address as shown in FIG. 8C from the main-memory-card-user information, and takes it to be the mail address 2503 shown in FIG. 25A of the destination where mail is to be sent (FIG. 24: S2401). The e-mail address of the owner of the memory card 120 is stored in the e-mail address 801.

Furthermore, the mail-sending/receiving unit 2302 acquires the current date and time from the timer (not shown in the figure), and takes it to be the date and time of use 2505 as shown in FIG. 25A (FIG. 24: S2401).

Based on the above information, the mail-sending/receiving unit 2302 generates mail-transmission information 2501, and that mail-transmission information 2501 is shown in detail in FIG. 25B. In the mail-transmission information 2511, 'yamada@saijo.xx.jp' is stored in the mail address of the source, 'tanaka@saijo.xx.jp' is stored in the mail address of the destination, 'memory-card-use information' is stored in the subject, 'Mon. 7, May 2002 15:06:44+0900' is stored in the date and time of use acquired as a current date and time from the timer not shown in the figure, 'Yamada' is stored in the apparatus-user name, and '1-1-1 Saijo, Hiroshima City' is stored in the address information.

Next, the mail-sending/receiving unit 2301 sends the mail-transmission information 2511 to a terminal that is capable of receiving e-mail via the Internet, for example (FIG. 24: S2402).

As described above, in the case that the owner of the memory card reading/writing apparatus is different than the owner of the memory card, the owner of the memory card is notified by e-mail that the memory card is being used, when the user who is the owner of the memory card reading/writing apparatus inserts the memory card, so it is possible for the owner of the memory card to know the status of use of the memory card from a remote location.

In the case that the address information is current address that is obtained from GPS (Global Positioning System), it is possible to know the position of the card when the card is lost.

Next, the case of the e-mail being received by a PDA that comprises to the function described above (mail-notification function).

Figure 27:
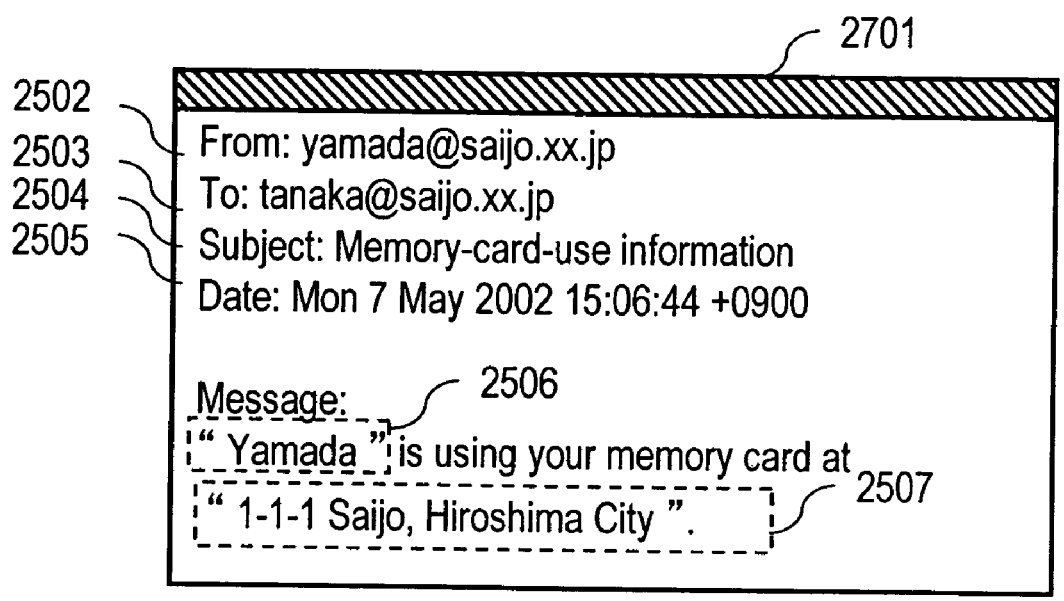
FIG. 27 is a display example of e-mail message related to the memory-card-user information.

When receives the sent e-mail from the mail-sending/receiving unit 2302, the PDA 2601 outputs a display that includes the mail address of the source 2502, mail address of the destination 2503, subject 2504, date and time of use 2505, apparatus-user name 2506 and address information 2507 as shown in FIG. 27. This display is the same as the received e-mail.

Figure 33A:
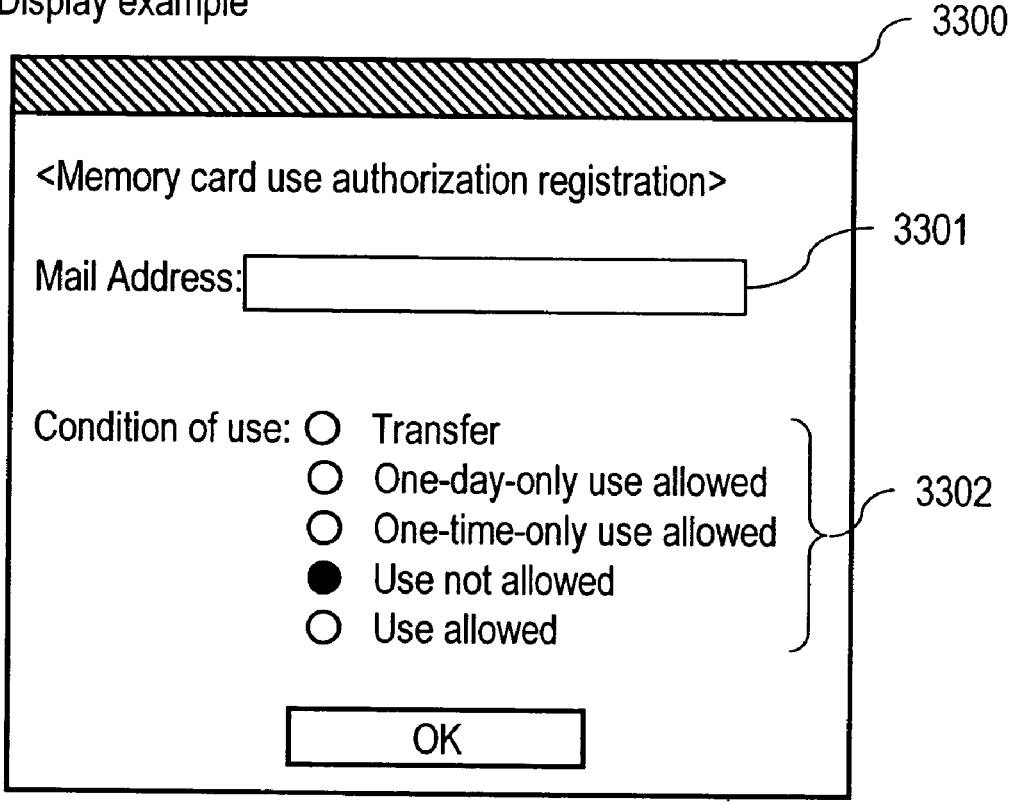
FIG. 33A and FIG. 33B are drawings showing the use-authorization-registration screen and a display example of the memory-card-use-authorization-verification display.

In response to this, the use-authorization-information-generation unit 2603 of the PDA 2601 outputs a dialog box to the display of the PDA 2601 asking the user to enter the use authorization setting. An example of the output is shown in FIG. 33A. Here, the e-mail address of the PDA 2301 (mail address of the source 2502) is automatically entered in the address 2301.

In response to the dialog box 3300 asking for input, it is presumed that the user of the PDA 2601 (Tanaka) has selected 'Use Not Allowed' from among the conditions of use 3302, and pushed the OK button.

Figure 28:
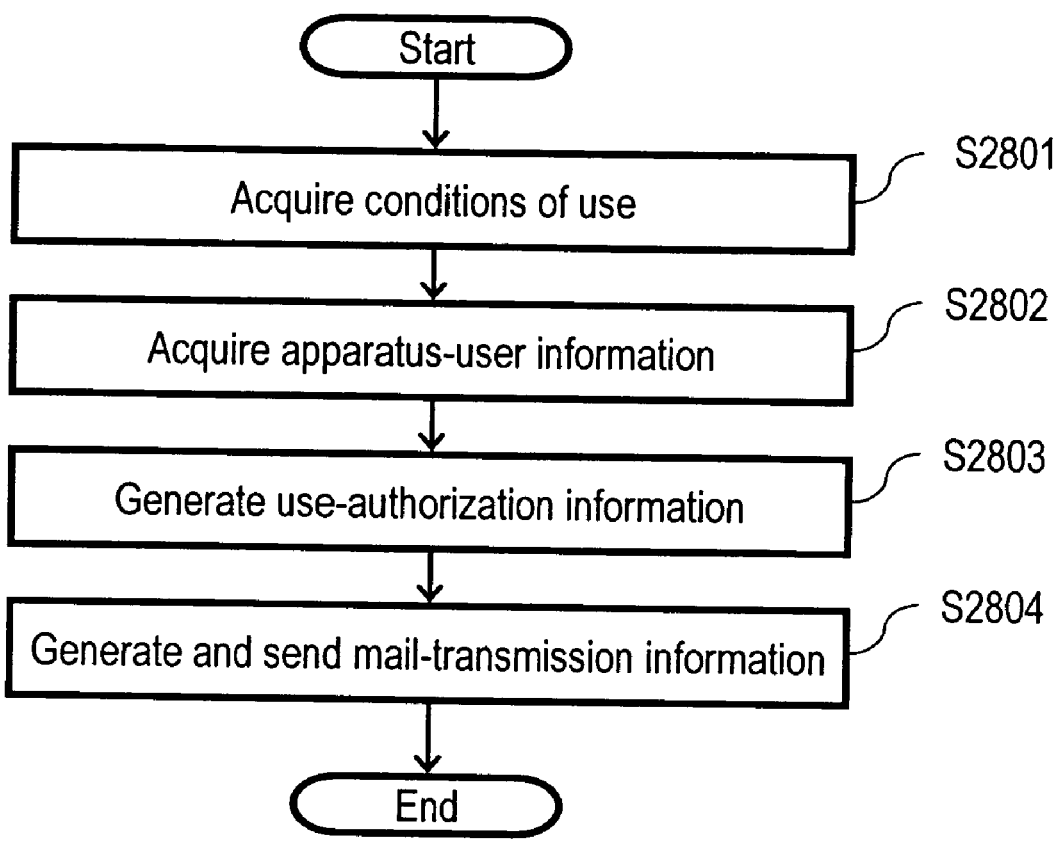
FIG. 28 is a first flowchart showing the processing of the memory card reading/writing apparatus (use-authorization sending side) of the third embodiment of the invention.

When doing this, the use-authorization-information-generation unit 2603 acquires the entered information, and generates use-authorization information 3100 as shown in FIG. 31A (FIG. 28: S2801). The user ID 3101, user name 3102 and conditions of use 3103 are included in the use-authorization information 3100. Information acquired from the apparatus-user information 101 of the PDA 2601 is stored in the user ID 3101 and the user name 3102, and value (0 to 4) are stored for the conditions of use 3103 as shown in FIG. 31C (FIG. 28: S2802-->S2803).

Details of the use-authorization information 3100 are shown in the use-authorization information 3110 of FIG. 31B. In other words, since the user selected 'Use Not Allowed', the corresponding value '3' is stored for the condition of use 3103. Also, based on the apparatus-user information 101 of the PDA 2601, '0124' is stored for the user ID 3101, and 'Tanaka' is stored for the user name 3102.

Next, the use-authorization-information-generation unit 2603 generates mail-transmission information that contains the use-authorization information 3110 (FIG. 28: S2804). The configuration of the mail-transmission information used here is shown in FIG. 32A. The mail address of the source 3202 that is stored in the apparatus-user information 101 of the PDA 2601, the mail address for the destination that is the mail address of the PDA 2301, the subject 3204, the current date and time 3205 that were obtained from the timer not shown in the figure, and the use-authorization information 3100 that was just generated, are included in the mail-transmission information 3201.

The mail-transmission information 3201 is shown in detail in FIG. 32B. Here, 'tanaka@saijo.xx.jp' is stored in the mail address of the source, 'yamada@saijo.xx.jp' is stored in the mail address for the destination, 'memory card use authorization verification' is stored in the subject, 'Mon. 7 May, 2002 15:06:44+0900' is stored in the current date and time, '0124' is stored in the user ID, 'Tanaka' is stored in the apparatus-user name, and '3' is stored in the condition of use.

After the mail-transmission information 3201 has been generated, the mail-sending/receiving unit 2602 sends the e-mail to the PDA 2301 based on that mail-transmission information 3201 (FIG. 28: S2804).

Next, the mail-sending/receiving unit 2302 receives the mail from the PDA 2601, and then the user-information-comparison unit 104 acquires the use-authorization information 3110 that is contained in the e-mail (FIG. 29: S2901).

Also, the memory-card-user-information-acquisition unit 103 acquires the main-memory-card information 121 from the memory card that was inserted when the use-authorization information 3110 is acquired, or from a newly inserted memory card (FIG. 29: S2902).

Next, the user-information-comparison unit 104 compares whether or not the user ID 3101 contained in the use-authorization information 3110 matches the user ID in the main-memory-card-user information 121 (FIG. 29: S2903).

Here, when the comparison result is that there is no match, the PDA 2301 performs other processing (FIG. 29: S2903, NO-->S2911). The other processing referred to here could be providing another function of the PDA.

On the other hand, when the comparison result is a match, the memory-card-access-control unit 2304 judges whether the condition of use is 'Use Not Allowed' (condition of use=3) (FIG. 29: S2903, YES-->S2904).

Since the condition of use here is 'Use Not Allowed', the memory-card-access-control unit 2304 sets the use-authorization flag 2306 that is stored on the memory card 120 to '0' in order to correspond to the condition of use 'Use Not Allowed' (FIG. 29: S2904, YES-->S2909). When the use-authorization flag is '0', it means that the memory card is locked, and means that the information (except for the main-memory-card-user information) on the memory card cannot be used (written or read). When the flag is '0' it is also possible for it to mean that there are no contents on the card and that only empty space can be referenced, or that the contents can be read only.

Here, when the condition of use is not 'Use Not Allowed', the memory-card-access-control unit 2304 changes the use-authorization flag of the memory card 120 to '1' to unlock the memory card 120, and then performs the next judgment (FIG. 29: S2904, NO-->S2905-->S2906).

Next, the memory-access-control unit 2304 judges whether the condition of use is 'Use Allowed' (condition of use=4) (FIG. 29: S2906). When the condition of use here is 'Use Allowed', processing ends (FIG. 29: S2906, YES-->End).

Here, when the condition of use is not 'Use Allowed', the memory-card-access-control unit 2304 further judges whether the condition of use is 'One-Time-Only Use Allowed' (condition of use=2). When the condition of use is 'One-Time-Only Use Allowed', ejection of the memory card is detected, and when the memory card is ejected, the use-authorization flag 2306 is set to '0' to lock the memory card (FIG. 29: S2907, YES-->S2908, YES-->S2909). In other words, while the memory card 120 is inserted, it is possible to access the memory card 120.

Next, when the condition of use is not 'One-Time-Only Use Allowed', the process A (S2910) shown in FIG. 30 is performed. (FIG. 29: S2907, NO-->S2910).

In the process A, first the memory-card-access-control unit 2304 judges whether the condition of use is 'Transfer' (condition of use=0). When the condition of use is 'Transfer', the memory-card-information-writing unit 2305 acquires the apparatus-user information 101 by way of the apparatus-user-information-acquisition unit 102, and rewrites the main-memory-card-user information 121 with the contents of the apparatus-user information 101 (FIG. 30: S3001, YES-->S3002-->S3003). In this way, the memory card 120 becomes the card of the user of the PDA 2301.

Furthermore, when the judgment result is that the condition of use is not 'Transfer', the memory-card-access-control unit 2304 judges whether the condition of use is 'One Day Only' (condition of use=1) (FIG. 30: S3001, NO-->S3004).

Here, when the judgment result is that the condition of use is 'One Day Only', the timer not shown in the figure is activated, and when one day has elapsed, the memory-card-access-control unit 2304 sets the use-authorization flag to '0' to lock the memory card 120 (FIG. 30: S3004, YES-->S3005-->S3006, YES-->S3007). When the judgment result is that the condition of use is not 'One Day Only', the memory-card-access-control unit 2304 immediately sets the use-authorization flag to '0' to lock the memory card 120 (FIG. 30: S3004, NO-->S3007). Instead of locking the card it is possible to perform the mild security described above.

Figure 33B:
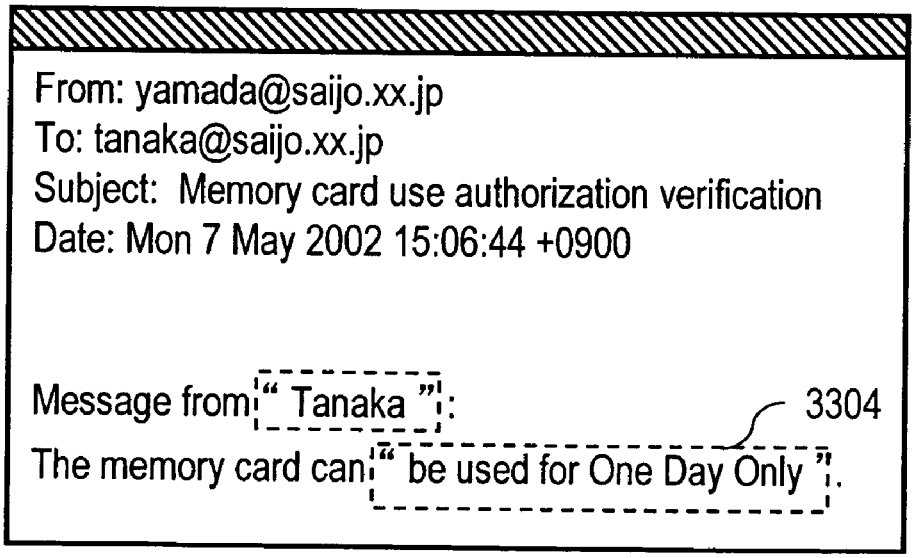

After each process has ended, the PDA 2301 displays the display 3304 as shown in FIG. 33B according to the use authorization.

By giving a numerical value to 'One Day Only', for example, it is also possible to give authorization to use the card in units of hours. Also, by having the access-control unit counts the number of times the memory card has been removed and inserted, it is possible to manage the number of times the memory card can be used, and so it is also possible to set the memory card such that it can be inserted and removed more than one time.

By having the memory-card-access-control unit control access of the memory card based on information contained in an e-mail, not only is it possible to know the status of use of the memory card in realtime, but it is also possible to control access of the memory card from a remote location.

With the memory card reading/writing apparatus of this invention, apparatus-user information is compared with the main-memory-card-user information, and based on the comparison result, specific information (warning, etc.) is output, so it is possible to identify the owner of the memory card without having to check the contents of the memory card in detail. Also, when compared with the case of performing no security at all, it is possible to prevent information recorded on the memory card from being read by mistake.

Moreover, even when the apparatus-user information does not match the main-memory-card-user information, it is possible to read, reference and reproduce the information recorded on the memory card, so when compared with the case of performing stringent security, smooth operation is possible even when the memory card is shared among more than one person.

Furthermore, when the apparatus-user information matches the main-memory-card-user information, it is possible for the memory-card-contents-list-information-acquisition unit to display a list of the memory card contents when the memory card is inserted. Therefore, the user is able to easily check the contents of the memory card, or in other words, it is possible for the user to easily manage the data stored on the memory card.

Furthermore, by comparing a plurality of items of memory-card user information on the memory card with each apparatus-user information, the user can automatically obtain information from the user's own area by simply inserting the memory card. This makes it possible to improve convenience when many users use a large-capacity memory card together.

Moreover, when the owner of the memory card reading/writing apparatus is different than the owner of the memory card, it is possible to record log information on the memory card that contains the apparatus-user information of the apparatuses that have accessed the memory card. Therefore, the owner of the memory card can know when other people have used the memory card.

Also, when the memory card is used in an operation such as for a circulating bulletin that requires that information on the progress of circulation be kept, by recording log information, it is possible to automatically know the progress of circulation.

Furthermore, when the owner of the memory card reading/writing apparatus is different than the owner of the memory card, it is possible to include information in the information that is output to the display by the output unit that indicates the a log will be created if the information on the memory card is read, or in other words, information indicating that a log will be created of access of the memory card. By including this kind of information, it is possible to strengthen the security from a psychological aspect when others read the information on the memory card.

Moreover, by saving referenced-contents information about referenced-contents in addition to the memory-card-user information, it is possible for the owner of the memory card to know which contents have been referenced. Therefore, even in the case the memory card is accidentally lost and then found later, it is possible to take appropriate action based on the referenced contents.

Also, when the comparison result is that there is no match, the function of the memory card reading/writing apparatus is lowered, which lowers the convenience of the memory card reading/writing apparatus, and as a result it is possible to increase the mild security function.

Furthermore, by recording members of a group that are allowed to use the memory card in sub-memory-card-user information, it is possible for users registered in the sub-memory-card-user information to use the memory card without any warning. In other words, using the sub-memory-card-user information that is registered on the memory card, it becomes possible for a user group to use the card, so it is possible to give members of the user group free access to the memory card, and to easily set mild restrictions for others.

Moreover, since it is possible for the owner of a memory card to rewrite the main-memory-card-user information for his/her own memory card, it is becomes possible to easily transfer the memory card to other while at the same time maintain mild security. As a result, it is possible to promote distribution of contents using the memory card.

Also, it is possible to select the new user ID and new user name from the sub-memory-card-user information. In this case, not only is input easy, but since the main-memory-card-user information of the user's own memory card is only rewritten with user information of a trusted user that was registered beforehand, for example a specific group member, it is possible to easily transfer the memory card to others while at the same time avoiding distribution of personal information by mistake. By writing the main-memory-card-user information with entering the new user ID and new user name, it is possible to distribute the memory card to an unlimited number of people without mild security, just as in the case of a newly purchased memory card.

Furthermore, by saving old-apparatus-user information, when the apparatus-user information (new-apparatus-user information) does not match the main-memory-card-user information, the main-memory-card-user information is then compared with the old-apparatus-user information. In this way, even when the apparatus-user information changes due to transferring the memory card, the existing memory-card-user information is automatically rewritten, or in other words, it is possible to reduce the amount of work of re-writing the main-memory-card-user information.

Moreover, when the owner of the memory card reading/writing apparatus is different than the owner of the memory card, the owner of the memory card is notified by e-mail when the memory card is used when the user inserts the memory card, so it is possible for the owner of the memory card to know the status of the use of the memory card from a remote location.

Also, by making the address information current address information that is obtained from GPS, it is possible to know the location of the memory card even when it is lost.

Furthermore, by having a memory-card-access-control unit control access of the memory card based on information contained in an e-mail, not only is it possible to know the status of use of the memory card in realtime, but it is also possible to control access of the memory card from a remote location.

What is claimed is:

1. A memory card reading/writing apparatus that is capable of accessing data recorded on a memory card and comprising:

a memory unit operable to store apparatus-user information that identifies the user of said memory card reading/writing apparatus;

an apparatus-user-information-acquisition unit operable to acquire said apparatus-user information from said memory unit;

a memory-card-user-information-acquisition unit operable to acquire from said memory card main-memory-card-user information that identifies the main user of said memory card;

a user-information-comparison unit operable to compare said apparatus-user information and main-memory-card-user information, and to output the comparison result; and an output unit operable to output a specific output based on said comparison result.

2. The memory card reading/writing apparatus of claim 1 wherein;

said output unit outputs information indicating no match when said apparatus-user information does not match said main-memory-card-user information.

3. The memory card reading/writing apparatus of claim 2 wherein;

said output unit outputs information of the main user of the memory card when said comparison result indicates there is not a match.

4. The memory card reading/writing apparatus of claim 1 further comprising:

a memory-card-contents-list-information-acquisition unit operable to acquire information showing a list of the data contents stored on said memory card, and wherein;

said output unit outputs information showing said list of data contents acquired by said memory-card-contents-list-information-acquisition unit when said comparison result indicates a match.

5. The memory card reading/writing apparatus of claim 4 such that when said memory card is partitioned into a plurality of areas and memory-card-user information, which is the information of the main users of each area, is related to each of the areas:
   said user-information-comparison unit compares said apparatus-user information with the memory-card-user information of each said area;
   said memory-card-contents-list-information-acquisition unit acquires information showing a list of data contents from the area corresponding to the memory-card-user information whose comparison result was a match; and
   said output unit outputs information showing the list of data contents acquired by said memory-card-contents-list-information-acquisition unit.

6. The memory card reading/writing apparatus of claim 1 further comprising a log-information-writing unit operable to write log information containing specific information including said apparatus-user information on said memory card when said comparison result indicates there is no match.

7. The memory card reading/writing apparatus of claim 6 wherein said log information further includes information related to the contents on said memory card that have been accessed.

8. The memory card reading/writing apparatus of claim 6 further comprising:
   a memory-card-contents-list-information-acquisition unit operable to acquire information showing a list of data contents stored on said memory card, and wherein:
   said output unit outputs information indicating that a log will be created of access of the memory card; and
   said log-information-writing unit writes said log information after said memory-card-contents-list-information-acquisition unit acquires information showing a list of data contents stored on said memory card.

9. The memory card reading/writing apparatus of claim 1 further comprising a function-restriction unit operable to perform a process of lowering the function of the memory card reading/writing apparatus based on said comparison result.

10. The memory card reading/writing apparatus of claim 1 wherein:
   said memory-card-user-information-acquisition unit acquires sub-memory-card-user information from said memory card that identifies users of said memory card that are different than said main-memory-card-user information, and
   said user-information-comparison unit compares said apparatus-user information with said sub-memory-card-user information, and outputs a comparison result.

11. The memory card reading/writing apparatus of claim 1 wherein said output unit is a mail-transmission unit operable to send e-mail to an e-mail address that is included in said main-memory-card-user information when said comparison result is no match.

12. The memory card reading/writing apparatus of claim 11 further comprising:
   a GPS (Global Positioning System); wherein
   said user information contains current position information that is obtained from said GPS.

13. The memory card reading/writing apparatus of claim 11 further comprising:
   a mail-receiving unit operable to receive e-mail and to acquire apparatus-user information from the received e-mail that identifies the user of the apparatus that sent the e-mail;
   a user-information-comparison unit operable to compare said apparatus-user information acquired by the received e-mail and said main-memory-card-user information, and to output the comparison result; and
   an access-control unit operable to control access of said memory card based on said comparison result.

14. The memory card reading/writing apparatus of claim 13 wherein said access-control unit controls access of said memory card based on conditions of use that are included in said e-mail.

15. The memory card reading/writing apparatus of claim 14 wherein said access-control unit manages the period of time said memory card can be used based on said conditions of use.

16. An access method of a memory card reading/writing apparatus that is capable of accessing data recorded on a memory card and comprising:
   acquiring apparatus-user information that identifies the user of said memory card reading/writing apparatus from memory unit storing said apparatus-user information;
   acquiring from said memory card main-memory-card-user information that identifies the main user of said memory card;
   comparing said apparatus-user information and main-memory-card-user information;
   outputting the comparison result; and
   outputting a specific output based on said comparison result.

17. A program stored on a computer readable medium that is executed by a memory card reading/writing apparatus and causes the apparatus to access data recorded on the computer readable medium and to perform the steps of:
   acquiring apparatus-user information that identifies the user of said memory card reading/writing apparatus from memory unit storing said apparatus-user information;
   acquiring from said memory card main-memory-card-user information that identifies the main user of said memory card;
   comparing said apparatus-user information and main-memory-card-user information;
   outputting the comparison result; and
   outputting a specific output based on said comparison result.

18. A computer readable medium storing a program executed by a memory card reading/writing apparatus that is capable of accessing data recorded on a memory card the program performing the steps of:
   acquiring apparatus-user information that identifies the user of said memory card reading/writing apparatus from memory unit storing said apparatus-user information;
   acquiring from said memory card main-memory-card-user information that identifies the main user of said memory card;
   comparing said apparatus-user information and main-memory-card-user information;
   outputting the comparison result; and
   outputting a specific output based on said comparison result.

* * * * *